(12) United States Patent
Nadig et al.

(10) Patent No.: US 11,455,998 B1
(45) Date of Patent: Sep. 27, 2022

(54) SENSITIVE DATA CONTROL

(71) Applicant: Amazon Technologies, Inc., Seattle, WA (US)

(72) Inventors: Vinaya Nadig, Bothell, WA (US); Shipra Agarwal Kanoria, Mountain View, CA (US); Elad Refael Kassis, Sunnyvale, CA (US); Ambika Babuji, Freemont, CA (US); Neelesh Deo Dani, Vancouver (CA); Rohan Mutagi, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 263 days.

(21) Appl. No.: 16/834,696

(22) Filed: Mar. 30, 2020

(51) Int. Cl.
| | |
|---|---|
| *G10L 15/22* | (2006.01) |
| *G10L 15/26* | (2006.01) |
| *G10L 15/18* | (2013.01) |
| *G06F 21/62* | (2013.01) |
| *H04L 67/306* | (2022.01) |
| *G06F 9/54* | (2006.01) |
| *H04W 4/12* | (2009.01) |
| *G10L 17/22* | (2013.01) |
| *G10L 13/00* | (2006.01) |

(52) U.S. Cl.
CPC .............. *G10L 15/26* (2013.01); *G06F 9/542* (2013.01); *G06F 21/6245* (2013.01); *G10L 13/00* (2013.01); *G10L 15/1815* (2013.01); *G10L 17/22* (2013.01); *H04L 67/306* (2013.01); *H04W 4/12* (2013.01)

(58) Field of Classification Search
CPC ..... G10L 15/26; G10L 13/00; G10L 15/1815; G10L 17/22; G06F 9/542; G06F 21/6245; G06F 17/21; G06F 21/316; H04L 67/306; H04W 4/12; G06Q 30/04; G06Q 10/063114; G06Q 50/265
USPC ........................................................ 704/275
See application file for complete search history.

(56) References Cited

U.S. PATENT DOCUMENTS

| | | | |
|---|---|---|---|
| 10,650,128 B2* | 5/2020 | Nowak | G06F 21/316 |
| 10,733,685 B1* | 8/2020 | Gailloux | G06Q 50/265 |
| 2015/0193379 A1* | 7/2015 | Mehta | G06F 17/21 |
| | | | 704/9 |
| 2019/0095846 A1* | 3/2019 | Gupta | G06Q 10/063114 |

* cited by examiner

*Primary Examiner* — Md S Elahee
(74) *Attorney, Agent, or Firm* — Pierce Atwood LLP

(57) ABSTRACT

A system is provided for determining privacy controls for output including sensitive data. A user may subscribe to receive an output in the future based on the occurrence of an event. The system may determine when the event is occurred triggering the output, and determine that the output includes outputting sensitive data. The system may determine output data that does not include the sensitive data, send the output data to a device, and may request the user to provide an authentication input to receive the sensitive data.

20 Claims, 11 Drawing Sheets

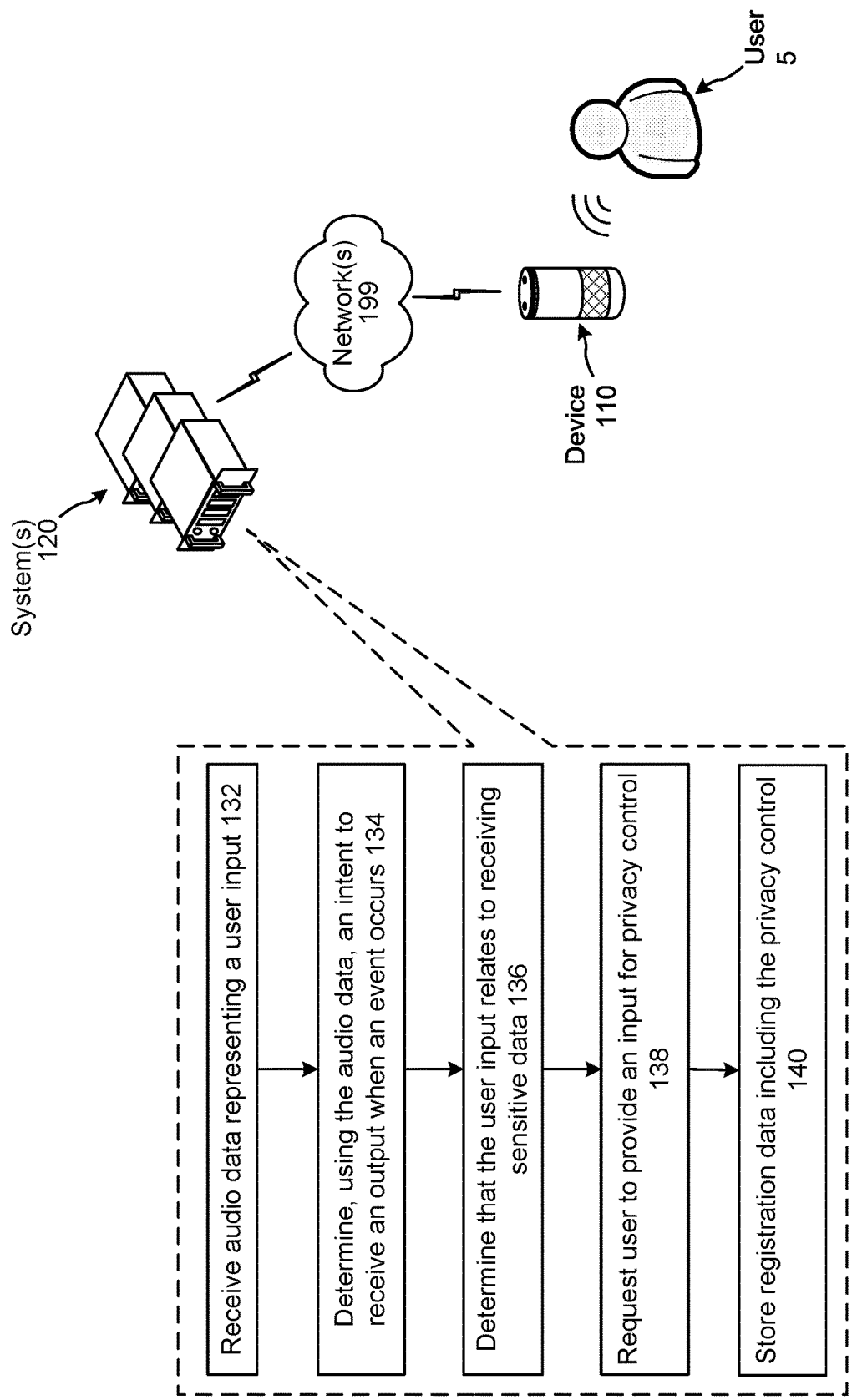

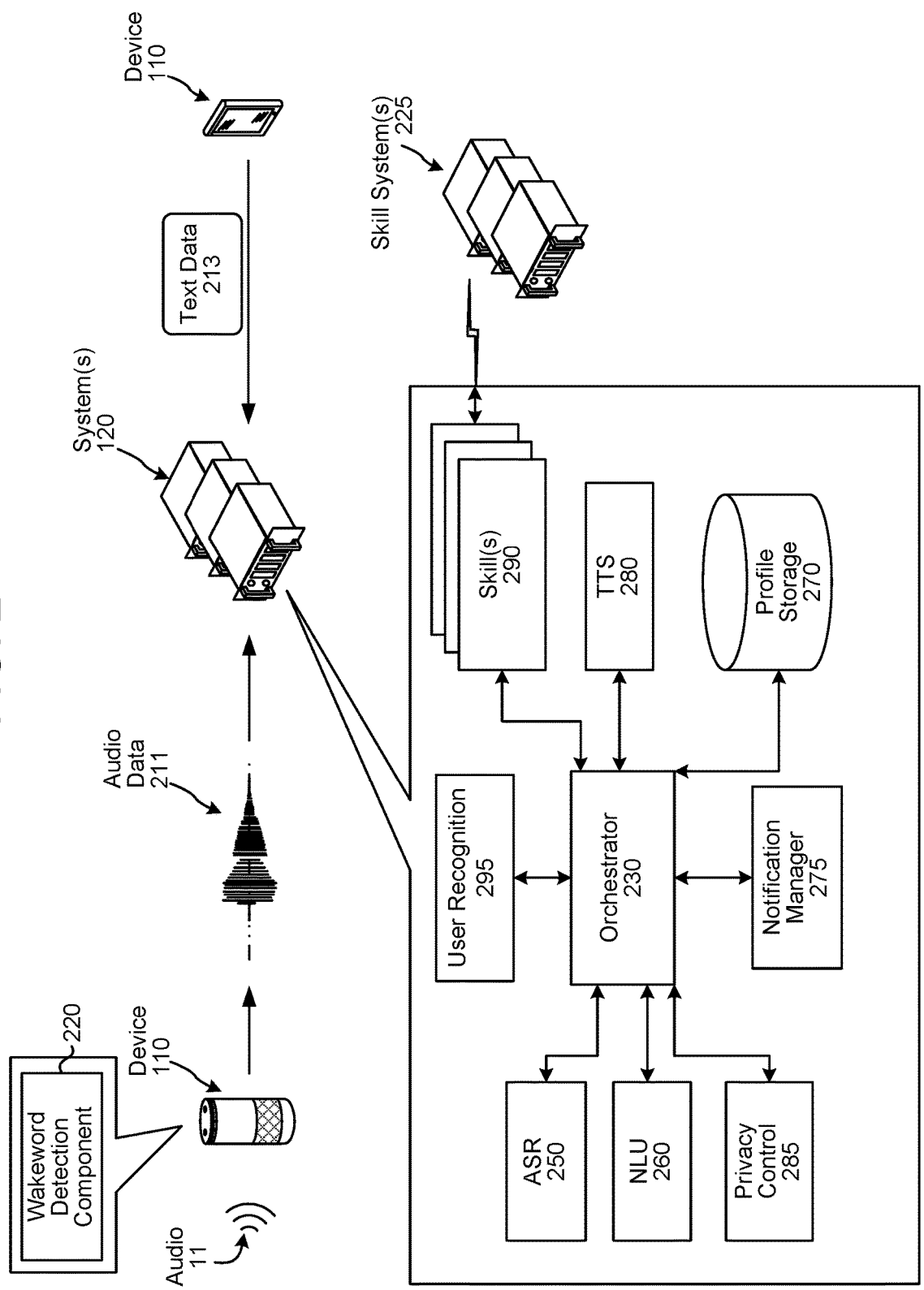

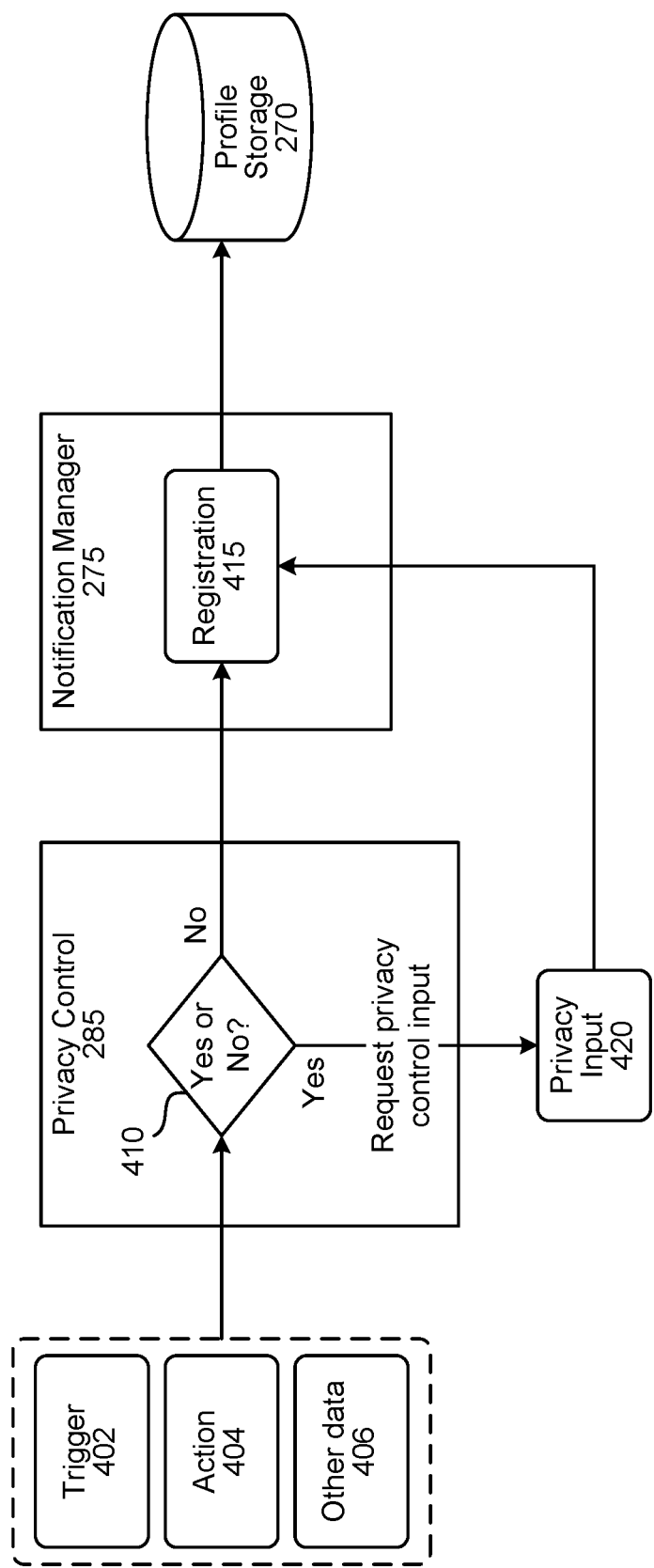

SENSITIVE DATA CONTROL

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1A illustrates a system configured to respond to a user request to receive an output in the future along with sensitive data controls for a user according to embodiments of the present disclosure.

FIG. 2 is a conceptual diagram of components of a system according to embodiments of the present disclosure.

FIG. 4A is a conceptual diagram of a privacy control component and a notification manager to generate registration data using sensitive data controls according to embodiments of the present disclosure.

DETAILED DESCRIPTION

Figure 1B:
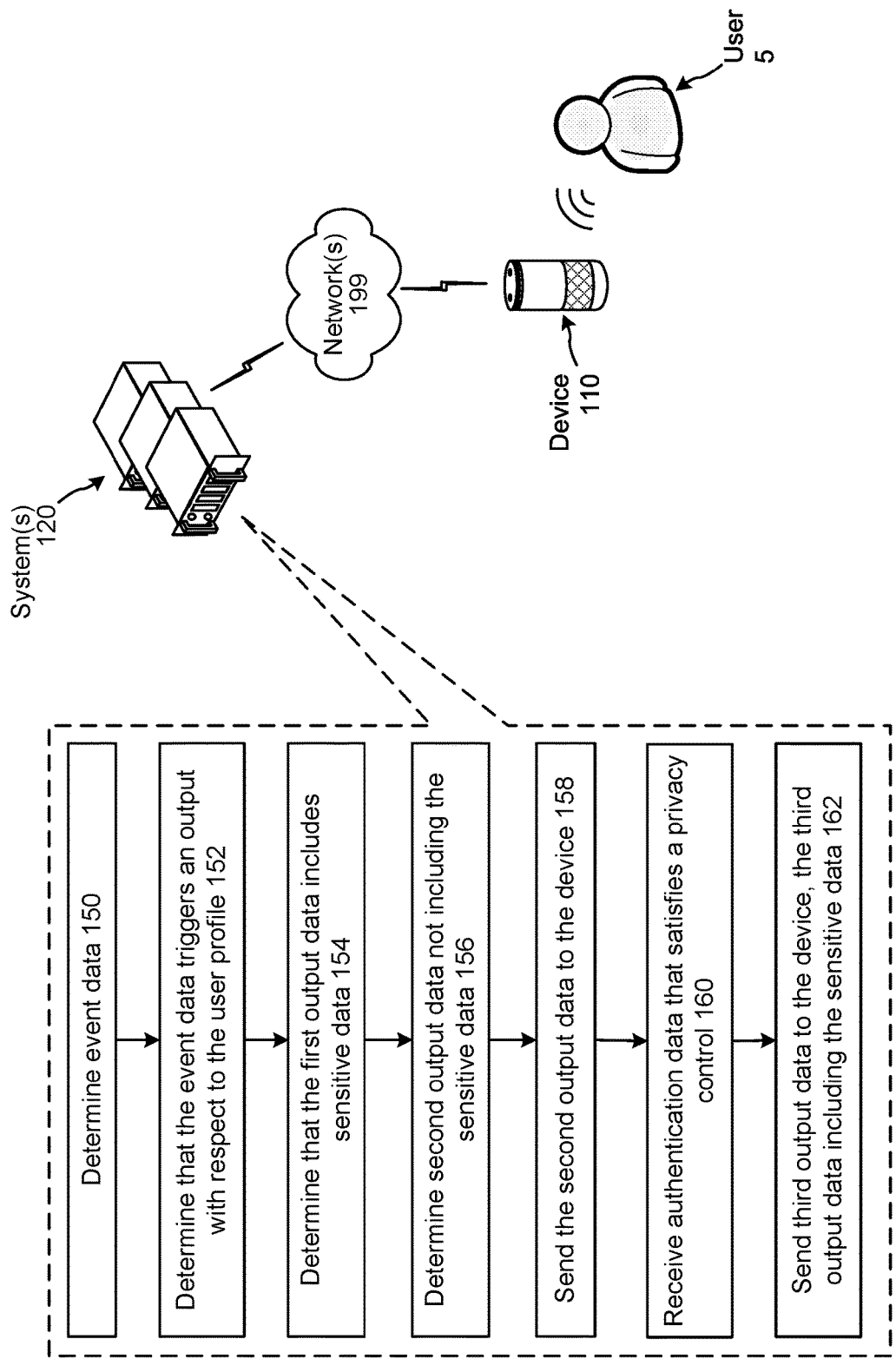
FIG. 1B illustrates a system configured to generate output data, using sensitive data controls, when an event occurs according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Certain systems may be configured to perform actions responsive to user inputs. For example, for the user input of "Alexa, play Adele music," a system may output music sung by an artist named Adele. For further example, for the user input of "Alexa, what is the weather," a system may output synthesized speech representing weather information for a geographic location of the user. In a further example, for the user input of "Alexa, send a message to John," a system may capture spoken message content and cause same to be output via a device registered to "John."

A system may receive a user input requesting the system to perform a particular action when a particular event occurs. For example, a user input may be "Alexa, tell me when I receive an email from Joe," and the system may create and store registration data that causes the system to generate and send a notification to the user when an email from Joe is received. Another user input may be "notify me when my prescription for Asthma is ready for pickup," and the system may create and store registration data that causes the system to generate and send a notification to the user when the prescription is ready.

In some cases, the user may not want other persons to know certain information that may be included in an output that is generated in response to an event occurring. For example, the user may not want a communal, smart speaker device to simply make an announcement, for all who are nearby to hear, when a medical prescription is ready for pickup.

The improved system of the present disclosure determines when an output, generated in response to an event occurring, may or, in some embodiments, likely includes private, confidential, personal or otherwise sensitive data, and applies an appropriate privacy control before outputting so that the sensitive data is not broadcasted without user authentication. In some cases, when the user requests to receive a notification when an event occurs, and the system determines that the request relates to outputting sensitive data, the system may ask the user to set a privacy control for receiving the output in the future when the event occurs. For example, the user may say "Alexa, tell me when my prescription for Asthma is ready." The system may respond "please provide a password to receive the notification in the future."

In some cases, when the indicated event occurs and the system determines that the responsive output includes sensitive data, the system may modify the output to not include the sensitive data. The system may also ask the user to provide authentication data to receive the sensitive data. For example, the system may determine that a prescription for Asthma is ready for pickup, and may output the following announcement to the user "you have a medical notification. To receive further details, please provide voice authentication."

In other cases, the user may provide privacy control settings when requesting to receive a notification, and the system may generate an output according to the privacy control settings when the event occurs. For example, the user may say "Alexa, notify me when I receive an email from Joe." The system may respond "Ok, I will notify you. Do you want to enable password protection for this notification," the user may respond "yes" and provide a password. When an email from Joe is received, the system may output the following notification "you have a new email. Please provide a password to receive details."

In some cases, the user may provide content-based privacy controls. For example, the user input may be "Alexa, do not announce any of my medical or prescription information without authentication." The system may determine that an output relating to medical or prescription information is generated (in response to an event occurring or in response to a user request), and apply the privacy controls.

In some embodiments, the system may also apply privacy controls to when responding to an incoming user request. For example, the user input may be "Alexa, what is on my calendar today?" or "Give me details on my appointment today." The system may determine that the user's calendar has a doctor appointment, and that outputting information relating to the appointment may include sensitive data. In this case, the system may respond "you have an appointment at 2 PM today. To receive more details please provide authentication."

FIG. 1A illustrates a system configured to respond to a user request to receive an output in the future along with sensitive data controls for a user according to embodiments of the present disclosure. FIG. 1B illustrates a system configured to generate output data, using sensitive data controls, when an event occurs according to embodiments of the present disclosure. Although the figures and discussion herein illustrate certain operational steps of the system in a particular order, the steps described may be performed in a different order (as well as certain steps removed or added) without departing from the intent of the disclosure. As illustrated in FIGS. 1A and 1B, the system may include device 110 local to a user 5, in communication with one or more systems 120 across one or more networks 199.

The system(s) 120 receives (132) audio data representing a user input. The audio data may include a user input/utterance spoken by the user 5 and captured by the device 110. The system(s) 120 determines (134), using the audio data, that the user's intent is to receive an output when an event occurs. The system(s) 120 may perform automatic speech recognition (ASR) processing on the audio data to determine text data representing the user input. Further details on how the system(s) 120 may perform ASR processing are described below in relation to FIG. 2. The system(s) 120 may perform natural language understanding (NLU) processing on the text data to determine an intent corresponding to the user input. The system(s) 120 may determine that user's intent is to receive data or to cause the system to perform an action in the future in response to an occurrence of an event.

The system(s) 120 may determine, using NLU and the text data, a trigger for executing an action. For example, if the user input is "notify me when I receive an email," the system(s) 120, using NLU, may determine that the intent is to receive a notification in the future, the trigger for receiving the notification is when the user receives an email, and the action to be executed when the user receives an email is to send the user a notification. As another example, the user input may be "turn on the lights when I arrive home," and the system(s) 120, using NLU, may determine that the intent is to perform a smart-home action in the future, the trigger is when the user arrives home, and the action to be executed is turning on the lights. As another example, the user input may be "tell me when my prescription is ready," and the system(s) 120, using NLU, may determine that the intent is to receive a notification in the future, the trigger is when the user's prescription is ready, and the action to be executed when the prescription is ready is to send the user a notification.

The system(s) determines (136) that the user input relates to receiving sensitive data. The system(s) 120 may determine that an output, which may be provided in the future in response to the occurrence of an event, may include sensitive data. The system(s) 120 may determine that the output includes sensitive data by processing the trigger and/or the action to be executed. For example, if the action is to receive a notification when a prescription is ready, the output that may be generated by the system(s) 120 in the future may be "your prescription for is ready" or "your prescription is ready." The system(s) 120 determines that the medical information, such as prescription information, that may be included in the output, is sensitive data that a user may not want other persons to know. Other information that may be determined by the system(s) 120 as being sensitive data includes, but is not limited to, medical information, health-related information, personal identification, personal correspondence, and age-related content (e.g., adult content).

In some embodiments, the system(s) 120 may determine that an output includes sensitive data by performing natural language understanding (NLU)/semantic analysis (e.g., processing information representing the natural language input to determine its meaning in a computer recognizable form). The system(s) 120 may perform NLU/semantic analysis using data representing the user input, the intent, and/or data representing a potential output to be presented in response to the event occurring, and may determine that one or more words in the output corresponds to sensitive data. Using NLU/semantic analysis, the system(s) 120 may determine that one or more words in the output corresponds to sensitive data based on understanding the meaning of the word(s) by relating syntactic structures, from the levels of phrases, clauses, sentences and paragraphs to the level of the writing as a whole, to their natural language meanings. For example, the user input may relate to receiving the user's bank account balance, and the system(s) 120 may determine, using the user input, the output and semantic analysis, that the output includes sensitive data relating to the user's account balance.

In some embodiments, the system(s) 120 uses NLU/semantic analysis to determine that word(s) in the output correspond to sensitive data categories. For example, the system(s) 120 may determine that the word "prescription" corresponds to the medical data category, the word "account balance" corresponds to the financial/banking data category, etc. The system(s) 120 requests (138) the user to provide an input for privacy control. The system(s) 120 stores the input and applies the privacy control in the future when presenting the output indicating event occurrence. For example, the system(s) 120 may request the user to provide a pin or password to receive the notification regarding the user's prescription or other medical information. The system(s) 120 stores (140) registration data with the privacy control. The system(s) 120 may store the registration data including the trigger, the action and the privacy control input in profile storage (e.g., 270) and associate it with the user profile for the user 5. When the system(s) 120 determines an event occurred triggering the stored action, the system(s) 120 also determines to apply privacy control to the responsive output. In some cases, the system(s) 120 may output a notification without including sensitive data. For example, the system(s) 120 may output synthesized speech representing "you have a medical notification." The system(s) 120 may also request the user to provide the privacy control input to authenticate/verify the user to receive the sensitive data. For example, the system(s) 120 may output synthesized speech representing "provide your password to receive further details."

In some embodiments, the system(s) 120 may ask the user 5 if any privacy controls are to be applied to the output that the user wants to receive. For example, the user input may be "notify me when I receive an email from Joe," and the system(s) 120 may respond "I will notify you. Do you want to enable password protection for this notification?" The user 5 may respond "yes" and provide a password. When the system(s) 120 determines that the user 5 received an email from Joe, the system(s) 120 may output "You received a new email. Please provide the password to receive further information." In response to receiving the correct password, the system(s) 120 may further output "you have received an email from Joe."

The operations of FIG. 1A may be performed during a first time period. The operations of FIG. 1B may be performed during a second time period, subsequent to the first time period.

Referring to FIG. 1B, the system(s) 120 may determine when providing an output in response to stored registration data that the output includes sensitive data and that privacy controls should be applied. The system(s) 120 determines (150) event data indicating occurrence of an event. The event data may be received from any of the components of the system(s) 120 or from a skill system 225. The event data, for example, may indicate that the user 5 received an email, or a prescription is ready for pickup, or that the user arrived at home. The system(s) 120 determines (152) that the event data triggers an output with respect to the user profile, using the trigger data and action data associated with the user profile of user 5.

The system(s) 120 determines (154) that first output data includes sensitive data, where the first output data may be responsive to the event occurrence or indicating the event occurrence to the user. The first output data may be determined by the system(s) 120 using the stored action data associated with the trigger data. For example, the first output data for the user request to receive a notification when the user's prescription for Asthma is ready, may be an announcement including synthesized speech notifying the user "your prescription for Asthma is ready." In other examples, the first output data may be text to be displayed on a device screen, text to be provided to the user via a push notification, text to be delivered via a message (SMS, email, voice message, etc.), or the first output data may other forms of output. Based on the first output data including prescription information, the system(s) 120 determines that the first output data includes sensitive data.

In some embodiments, the system(s) 120 may determine that the first output data includes sensitive data by performing natural language understanding (NLU) and semantic analysis using the first output data. The system(s) 120 may determine that one or more words in the first output data corresponds to sensitive data based on understanding the meaning of the word(s) by relating syntactic structures, from the levels of phrases, clauses, sentences and paragraphs to the level of the writing as a whole, to their natural language meanings. For example, the user input may relate to receiving the user's bank account balance, and the system(s) 120 may determine, using the user input, the output and semantic analysis, that the output includes sensitive data relating to the user's account balance.

In some embodiments, the system(s) 120 uses NLU and semantic analysis to determine that word(s) in the first output data correspond to sensitive data categories. For example, the system(s) 120 may determine that the word "prescription" corresponds to the medical data category, the word "account balance" corresponds to the financial/banking data category, etc.

The system(s) 120 determines (156) second output data that does not include the sensitive data, where the second output data may include indication of the event occurrence without details that relate to the sensitive data or may be a general notification so that the user may provide authentication data to receive the sensitive data. For example, the second output data may be synthesized speech notifying the user "you have a medical notification" or "you have a prescription notification" but does not include what the prescription is for. The second output data may correspond to the output responsive to the user request with respect to the action the user wanted perform in response to the event occurrence. For example, the first output data is a notification based on the user wanting to be notified when an event occurred, and the second output data is also a notification. Thus, the second output data includes non-sensitive data.

In some embodiments, the system(s) 120 may use natural language generation (NLG) to determine the second output data to not include the sensitive data of the first output data. Using NLG techniques, the system(s) 120 may determine a summary of the sensitive data such that the second output data does not include the sensitive data. In some embodiments, the system(s) 120 may use NLU and semantic analysis to determine the words/portion of the first output data that relates to non-sensitive data, and use that portion to determine the second output data.

In some embodiments, the first/second output data may cause the device 110 to output an announcement. In some embodiments, the first/second output data may cause the device 110 to display text. In some embodiments, the first/second output data may cause the device 110 to present a visual output (e.g., a yellow light ring, an icon, etc.) or an audible output (e.g., a chirp, etc.). In some embodiments, the first/second output data may cause the device 110 to receive a message (SMS, email, voice message, etc.), a push notification, or other forms of output.

The system(s) 120 sends (158) the second output data to the device 110 for presenting to the user 5. The second output data may also request the user to provide an authentication input if the user wants to receive additional information. The system(s) 120 receives (160) authentication data from the user that satisfies a privacy control. The system(s) 120 may use the authentication data to authenticate the user identity using user profile data associated with the user 5. For example, the authentication data requested by the system(s) 120 and provided by the user 5 may be a voice verification, a fingerprint, facial recognition, password or pin protection, input/approval in response to a push notification, other types of input via a device (e.g., pressing a button on the device, selecting a button/option displayed on a screen, etc.) or other types of authentication data. The system(s) 120 may compare the received authentication data with the profile data (e.g., voice, fingerprint, facial data, password, etc.) associated with the user 5 to authenticate the user identity. Details on how the authentication data is processed and the user identity is authenticated are described in relation to FIGS. 5 and 6.

The system(s) 120 sends (162) third output data to the device, where the third output data includes the sensitive data. The sensitive data is provided to the user in response to authenticating the user. In some embodiments, the user may specify how the sensitive data should be presented. For example, the user may indicate (via a voice input, graphical user interface input, or other types of input) that the sensitive data is announced via a speaker, displayed on a screen, provided via a message (SMS, email, push notification, etc.) or other provided to the user in another manner. The user may also indicate via which device the sensitive data is to be provided, for example, via a smartphone, a speech-controlled device, a smartwatch, or any of the devices 110 shown in FIG. 9.

In some embodiments, the system(s) 120 may store registration data including privacy control settings (as described with respect to operation 140 of FIG. 1A), and at operation 160 the system(s) 120 may determine that the received authentication data satisfies the privacy control associated with the registration data.

In some embodiments, the registration data may not be associated with a privacy control, and the system(s) 120 may determine which privacy control to apply prior to presenting the sensitive data to the user. The system(s) 120 may determine to use a privacy control corresponding to the type of user recognition data already stored/available for the user profile. For example, the system(s) 120 may determine to use a privacy control that requires the user to provide voice authentication (instead of a fingerprint) because the user profile already includes voice recognition data for the user 5 (and does not include fingerprint data for the user 5).

The system(s) 120 may also determine a type of privacy control to be satisfied for the user to receive the sensitive data. The system(s) 120 may determine the type of privacy control based on the type of the sensitive data to be presented to the user. For example, if the sensitive data relates to banking or financial information, then the system(s) 120 may require a fingerprint, and if the sensitive data relates to personal correspondence, then the system(s) 120 may require a password.

The system may operate using various components as illustrated in FIG. 2. The various components may be located on the same or different physical devices. Communication between various components may occur directly or across a network(s) 199.

An audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without MINI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 211, representing the audio 11, to the system(s) 120. The audio data 211 may include data corresponding to the wakeword, or the portion of the audio corresponding to the wakeword may be removed by the device 110 prior to sending the audio data 211 to the system(s) 120.

In some cases, the audio 11 may be an utterance from the user 5 relating to a request to receive an output when an event occurs. For example, the audio 11 may represent the utterance "Alexa, tell me when I get an email from _____" or "Alexa, tell me when my prescription for _____ is ready for pickup at the pharmacy." The system(s) 120 may perform the steps described in connection to FIG. 1A to store registration data using sensitive data controls. In other cases, the audio 11 may be an utterance from the user 5 relating to a code or password required to receive sensitive data. For example, the audio 11 may represent an alphanumeric code that the user 5 set, and the system(s) 120 may perform the steps described in connection to FIG. 1B to generate output data and outputting sensitive data when the correct code is provided by the user 5.

Upon receipt by the system(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 sends the input audio data 211 to an ASR component 250 that transcribes the input audio data 211 into input text data representing one more hypotheses representing speech contained in the input audio data 211. The text data output by the ASR component 250 may thus represent one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The ASR component 250 may also output respective scores for the one or more ASR hypotheses. Such text data and scores may be output, for example, following language model operations by the ASR component 250. Thus the text data output by the ASR component 250 may include a top scoring ASR hypothesis or may include an N-best list of ASR hypotheses. An N-best list may additionally include a respective score associated with each ASR hypothesis represented therein. Each score may indicate a confidence of ASR processing performed to generate the ASR hypothesis with which the score is associated. Further details of the ASR processing are included below.

The device 110 may send text data 213 to the system(s) 120. Upon receipt by the systems(s) 120, the text data 213 may be sent to the orchestrator component 230, which may send the text data 213 to the NLU component 260. The text data 213 may be derived from an input(s) provided by the user 5 via an application/app on the device 110, where the user 5 may use the application/app to request output when an event occurs (as described in connection with FIG. 1A). The text data 213, for example, may be "notify me when I get an email from _____" or "tell me when my prescription for _____ is ready for pickup at the pharmacy."

The NLU component 260 receives the ASR hypothesis/hypotheses (i.e., text data) attempts to make a semantic interpretation of the phrase(s) or statement(s) represented therein. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the system(s) 120, a skill 290, a skill system(s) 225, etc.) to execute the intent. For example, if the text data corresponds to "play Adele music," the NLU component 260 may determine an intent that the system(s) 120 output music and may identify "Adele" as an artist. For further example, if the text data corresponds to "what is the weather," the NLU component 260 may determine an intent that the system(s) 120 output weather information associated with a geographic location of the device 110. In another example, if the text data corresponds to "turn off the lights," the NLU component 260 may determine an intent that the system(s) 120 turn off lights associated with the device(s) 110 or the user(s) 5.

The NLU component 260 may send NLU results data (which may include tagged text data, indicators of intent, etc.) to the orchestrator component 230. The orchestrator component 230 may send the NLU results data to a skill(s) 290. If the NLU results data includes a single NLU hypothesis, the orchestrator component 230 may send the NLU results data to the skill(s) 290 associated with the NLU hypothesis. If the NLU results data includes an N-best list of NLU hypotheses, the orchestrator component 230 may send the top scoring NLU hypothesis to a skill(s) 290 associated with the top scoring NLU hypothesis.

A "skill" may be software running on the system(s) 120 that is akin to a software application running on a traditional computing device. That is, a skill 290 may enable the system(s) 120 to execute specific functionality in order to provide data or produce some other requested output. The system(s) 120 may be configured with more than one skill 290. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the system(s) 120, a skill 290 may be implemented by a skill system(s) 225. Such may enable a skill system(s) 225 to execute specific functionality in order to provide data or perform some other action requested by a user.

Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system(s) 120 may be configured with a single skill 290 dedicated to interacting with more than one skill system 225.

Unless expressly stated otherwise, reference to a skill, skill device, or skill component may include a skill 290 operated by the system(s) 120 and/or skill operated by the skill system(s) 225. Moreover, the functionality described herein as a skill may be referred to using many different terms, such as an action, bot, app, or the like.

The system(s) 120 may include a TTS component 280 that generates audio data (e.g., synthesized speech) from text data using one or more different methods. Text data input to the TTS component 280 may come from a skill 290, the orchestrator component 230, or another component of the system(s) 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system(s) 120 may include profile storage 270. The profile storage 270 may include a variety of information related to individual users, groups of users, devices, etc. that interact with the system(s) 120. A "profile" refers to a set of data associated with a user, device, etc. The data of a profile may include preferences specific to the user, device, etc.; input and output capabilities of the device; internet connectivity information; user bibliographic information; registration data; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The profile storage 270 may include registration data corresponding to the user's request to receive an output identified by their respective user profiles. For example, the profile storage 270 may include trigger information (indicating when an action is to be executed) and action information (indicating the action that is to be executed). The profile storage 270 may also include information indicating the privacy preferences set by the user for receiving sensitive data. For example, the profile storage 270 may include the code set by the user that when the system(s) 120 receives it, it may provide the sensitive data to the user.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

The ASR engine 258 may return an N-best list of paths along with their respective recognition scores, corresponding to the top N paths as determined by the ASR engine 258. An application (such as a program or component either internal or external to the ASR component 250 that receives the N-best list may then perform further operations or analysis on the list given the list and the associated recognition scores. For example, the N-best list may be used in correcting errors and training various options and processing conditions of the ASR module 250. The ASR engine 258 may compare the actual correct utterance with the best result and with other results on the N-best list to determine why incorrect recognitions received certain recognition scores. The ASR engine 258 may correct its approach (and may update information in the ASR models 252) to reduce the recognition scores of incorrect approaches in future processing attempts.

The system(s) 120 may also include a notification manager 275. The notification manager 275 may process a user request to receive data, information or another output in the future based on occurrence of an event. The notification manager 275 may store the corresponding trigger data and the action data in the profile storage 270. The privacy control component 285 may process the user input to determine if the type of trigger data requires privacy controls and/or whether the user provides any privacy preferences with respect to receiving the notification. The notification manager 275 may process event data from the skill(s) 290 to determine whether an action is triggered. The privacy control component 285 may determine if any privacy controls/preferences are to be applied when executing the action.

Figure 3:
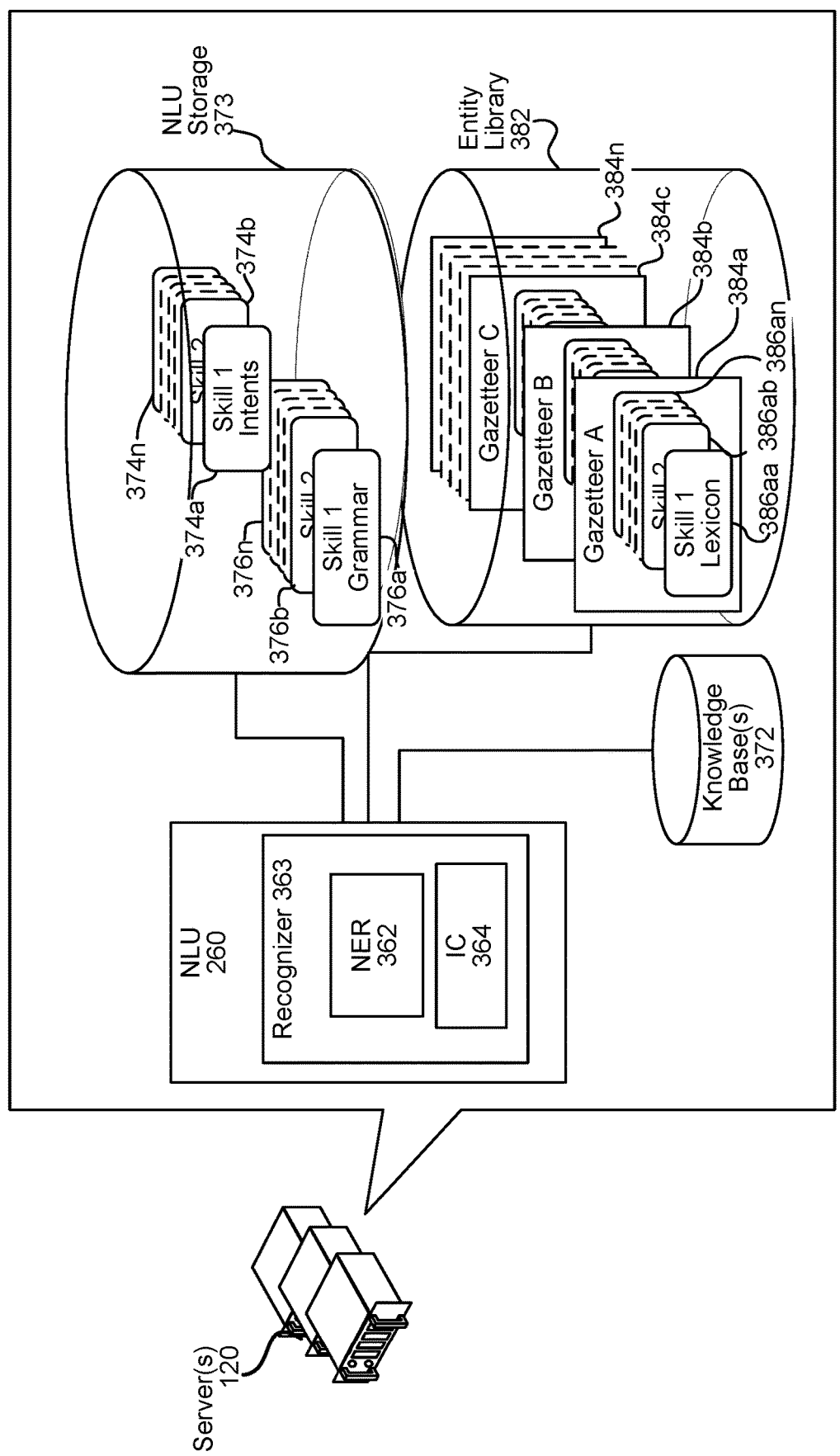
FIG. 3 is a conceptual diagram illustrating how natural language understanding processing is performed according to embodiments of the present disclosure.

FIG. 3 illustrates how NLU processing is performed on text data. Generally, the NLU component 260 attempts to make a semantic interpretation of text data input thereto. That is, the NLU component 260 determines the meaning behind text data based on the individual words and/or phrases represented therein. The NLU component 260 interprets text data to derive an intent of the user as well as pieces of the text data that allow a device (e.g., the device 110, the system(s) 120, skill system(s) 225, etc.) to complete that action.

The NLU component 260 may process text data including several ASR hypotheses. The NLU component 260 may process all (or a portion of) the ASR hypotheses input therein. Even though the ASR component 250 may output multiple ASR hypotheses, the NLU component 260 may be configured to only process with respect to the top scoring ASR hypothesis.

The NLU component 260 may include one or more recognizers 363. Each recognizer 363 may be associated with a different domain (e.g., smart home, video, music, weather, custom, etc.). Each recognizer 363 may process with respect to text data input to the NLU component 260. Each recognizer 363 may operate at least partially in parallel with other recognizers 363 of the NLU component 260.

Each recognizer 363 may include a named entity recognition (NER) component 362. The NER component 362 attempts to identify grammars and lexical information that may be used to construe meaning with respect to text data input therein. The NER component 362 identifies portions of text data that correspond to a named entity that may be applicable to processing performed by a domain. The NER component 362 (or other component of the NLU component 260) may also determine whether a word refers to an entity whose identity is not explicitly mentioned in the text data, for example "him," "her," "it" or other anaphora, exophora or the like.

Each recognizer 363, and more specifically each NER component 362, may be associated with a particular grammar model and/or database 373, a particular set of intents/actions 374, and a particular personalized lexicon 386. Each gazetteer 384 may include skill-indexed lexical information associated with a particular user and/or device 110. For example, a Gazetteer A (384a) includes skill-indexed lexical information 386aa to 386an. A user's music skill lexical information might include album titles, artist names, and song names, for example, whereas a user's contact list skill lexical information might include the names of contacts. Since every user's music collection and contact list is presumably different, this personalized information improves entity resolution.

An NER component 362 applies grammar models 376 and lexical information 386 to determine a mention of one or more entities in text data. In this manner, the NER component 362 identifies "slots" (corresponding to one or more particular words in text data) that may be used for later processing. The NER component 362 may also label each slot with a type (e.g., noun, place, city, artist name, song name, etc.).

Each grammar model 376 includes the names of entities (i.e., nouns) commonly found in speech about the particular domain to which the grammar model 376 relates, whereas the lexical information 386 is personalized to the user and/or the device 110 from which the user input originated. For example, a grammar model 376 associated with a shopping domain may include a database of words commonly used when people discuss shopping.

Each recognizer 363 may also include an intent classification (IC) component 364. An IC component 364 parses text data to determine an intent(s). An intent represents an action a user desires be performed. An IC component 364 may communicate with a database 374 of words linked to intents. For example, a music intent database may link words and phrases such as "quiet," "volume off," and "mute" to a <Mute> intent. An IC component 364 identifies potential intents by comparing words and phrases in text data to the words and phrases in an intents database 374.

The intents identifiable by a specific IC component 364 are linked to domain-specific grammar frameworks 376 with "slots" to be filled. Each slot of a grammar framework 376 corresponds to a portion of text data that the system believes corresponds to an entity. For example, a grammar framework 376 corresponding to a <PlayMusic> intent may correspond to sentence structures such as "Play {Artist Name}," "Play {Album Name}," "Play {Song name}," "Play {Song name} by {Artist Name}," etc. However, to make resolution more flexible, grammar frameworks 376 may not be structured as sentences, but rather based on associating slots with grammatical tags.

For example, an NER component 362 may parse text data to identify words as subject, object, verb, preposition, etc. based on grammar rules and/or models prior to recognizing named entities in the text data. An IC component 364 (e.g., implemented by the same recognizer 363 as the NER component 362) may use the identified verb to identify an intent. The NER component 362 may then determine a grammar model 376 associated with the identified intent. For example, a grammar model 376 for an intent corresponding to <PlayMusic> may specify a list of slots applicable to play the identified "object" and any object modifier (e.g., a prepositional phrase), such as {Artist Name}, {Album Name}, {Song name}, etc. The NER component 362 may then search corresponding fields in a lexicon 386, attempting to match words and phrases in text data the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse text data using heuristic grammar rules, or a model may be constructed using techniques such as hidden Markov models, maximum entropy models, log linear models, conditional random fields (CRF), and the like. For example, an NER component 362 implemented by a music recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 362 identifies "Play" as a verb, which an IC component 364 may determine corresponds to a <PlayMusic> intent. At this stage, no determination has been made as to the meaning of "mother's little helper" and "the rolling stones," but based on grammar rules and models, the NER component 362 has determined the text of these phrases relates to the grammatical object (i.e., entity) of the user input represented in the text data.

The frameworks linked to the intent are then used to determine what database fields should be searched to determine the meaning of these phrases, such as searching a user's gazetteer 384 for similarity with the framework slots. For example, a framework for a <PlayMusic> intent might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 384 does not resolve a slot/field using gazetteer information, the NER component 362 may search a database of generic words (e.g., in the knowledge base 372). For example, if the text data includes "play songs by the rolling stones," after failing to determine an album name or song name called "songs" by "the rolling stones," the NER component 362 may search the database for the word "songs." In the alternative, generic words may be checked before the gazetteer information, or both may be tried, potentially producing two different results.

An NER component 362 may tag text data to attribute meaning thereto. For example, an NER component 362 may tag "play mother's little helper by the rolling stones" as: {domain} Music, {intent}<PlayMusic>, {artist name} rolling stones, {media type} SONG, and {song title} mother's little helper. For further example, the NER component 362 may tag "play songs by the rolling stones" as: {domain} Music, {intent}<PlayMusic>, {artist name} rolling stones, and {media type} SONG.

FIG. 4A is a conceptual diagram of the notification manager 275 to generate registration data using sensitive data controls according to embodiments of the present disclosure. A user may provide input to receive a notification when an event occurs, where the system(s) 120 may perform an action indicated by the user when the indicated event occurs. As described above in relation to FIG. 1A, the user 5 may provide a voice input that may be processed by the system(s) 120 using the ASR component 250 to determine text data. In other cases, the user 5 may provide an input via an app and the system(s) 120 may determine text data 213 representing information relating to the user request.

The NLU component 260 may process the text data, as described above in relation to FIG. 3, to determine the user's intent to receive an output when an event occurs. The NLU component 260 may also process the text data to determine trigger data 402 indicating when an indicated action is to be executed/triggered and may also determine action data 404 indicating the action that is to be executed. For example, the user input text data may be "notify me when I get an email from Joe." The NLU component 260 may determine that "notify me when" indicates an intent to receive an output when an event occurs, "when I get an email from Joe" indicates the trigger data and the "notify" indicates the action data. In this case, the trigger data 402 may include <trigger: receive email>, <trigger: from 'Joe'>, and the action data 404 may include <generate notification>. In another example, the user input text data may be "tell me when my prescription for Asthma is ready." The NLU component 260 may determine that "tell me when" indicates an intent to receive an output when an event occurs, "when my prescription for Asthma is ready" indicates the trigger and "tell me" indicates the action. In this case, the trigger data 402 may include <trigger: prescription ready>, <trigger: prescription for 'Asthma'>, and the action data 404 may include <generate notification>. The NLU component 260 may also provide other data 406 representing one or more NLU hypotheses determined by the NLU component 260, the text data representing the user input, context data relating to user input, and other data. In some embodiments, the trigger data 402, action data 404 and other data 406 may be provided by another component of the system. For example, a skill developer or another type of user may want to create a notification that is sent to end-users (e.g., user 5) devices when an event occurs, and may provide the system(s) 120 the trigger data 402, action data 404, and other data 406.

The privacy control component 285 may process the trigger data 402, the action data 404 and other data 406 to determine (at decision block 410) if one or more privacy controls should be offered to the user for the particular request to receive an output when an event occurs. The privacy control component 285 may determine whether privacy controls should be offered based on the type of trigger and/or the type of action corresponding to the user request. For example, if a trigger or action relates to data that is considered private, confidential or otherwise sensitive, then the privacy control component 285 may ask if the user wants to set any privacy controls for receiving the output.

The privacy control component 285 may generate output text data, which may be processed by the TTS component 280 to generate output audio data representing the synthesized speech "do you want to set any privacy controls for this notification?" The output audio data may be sent to the device 110 for output. The user may respond affirmatively and may provide input representing the privacy control to be used for the notification. The system(s) 120 (using ASR and NLU) may process the input to determine the privacy input data 420. The notification manager 275 may determine the registration data 415 as including the privacy input 420. If the user responds in the negative, and does not provide any privacy controls, then the notification manager 275 may generate the registration data 415 without privacy controls.

In the case where the privacy control component 285 determines that the trigger and/or action is not the type where privacy controls are needed, then the notification manager 275 generates the registration data 415 without any privacy controls.

The privacy input 420 may include the type of authentication required to receive sensitive data or other data indicated by the user. In some embodiments, the types of authentication that may be used by the system(s) 120 include, but is not limited to, voice recognition, facial recognition, fingerprint authentication, retinal scan, other types of biometric identifications, pin/password, and other types of input. The types of authentication may also include denial/approval via a push notification, selection input via a device, such as pressing a button on the device, selecting a button/element displayed on a screen, providing a gesture, and other types of user interactions. In some embodiments, the privacy control component 285, may request approval from the user to present the sensitive data via a device, and the user may provide the approval by providing a voice input, a fingerprint, or other types of biometric information, a pin code/password, a selection input (by pressing a button on the device, selecting an option displayed on the screen, etc.) providing a gesture, or other forms of input to indicate approval. The authentication data may be provided by the user via a second device other than the first device that presented the notification/output triggered by the event occurrence. The second device may include a companion application for the system(s) 120, may be a retinal scanner, or other biometric data scanner. For example, a speech-controlled device 110*a* (the first device) may output "you have a medical notification. Please provide <authentication data>," and the user may provide the requested authentication data (fingerprint, approval in response to a push notification, facial scan, etc.) via a smartphone 110*b* (the second device). The system(s) 120 may then present the sensitive data via the first device, the second device, or a third device, as determined by the system(s) 120 or as specified by the user.

The privacy input 420 may also include, where applicable, the input required to receive the sensitive/indicated data. For example, if the authentication type is entry of a pin/code/password, then the privacy input 420 may include the particular the pin/code/password. If the authentication type is a form of biometric identification, the privacy input 420 may include the user's biometric data. In other embodiments, the privacy input 420 may not include the user's biometric data, rather, the system(s) 120 may use the biometric data stored in the profile storage 270 to authenticate the user and provide the sensitive data to the user.

The registration data 415 may include the trigger data 402, the action data 404 and other data, and the registration data 415 may be stored in the profile storage 270. Where applicable, the registration data 415 may also include the privacy input 420 representing the type of authentication (e.g., fingerprint, voice identification, pin/password, etc.) required and/or the input (e.g., code, password, etc.) required to receive sensitive data. In some embodiments, the registration data 415 may also include frequency data indicating the number of times an output is to be provided when the event occurs. For example, a user input may be "tell me each time is rains this week", then the frequency data may indicate "each time for 7 days." Another example user input may be "notify me the next two times my prescription is ready," and the frequency data may be "two/twice." Another example user input may be "notify me when my package is delivered," and the system may determine that the user wants to receive a one-time notification, determining the frequency data to be "one."

In some embodiments, the notification manager 275 may ask the user if he/she wants to apply any privacy controls, regardless of the trigger type or action type. The user may provide the privacy input data 420, and the notification manager 275 may store the registration data 415 as including the privacy input data 420.

In some cases, the user may indicate privacy controls to be applied when providing the input to generate the registration data. For example, the user input may be "Alexa, tell me when I get an email from Joe, and require a passcode before notifying me." The privacy control component 285 may determine, from the NLU data, that the user input includes privacy controls, and may determine the privacy input data 420 from the user input. The notification manager 275 may store the registration data 415 as including the privacy input data 420.

Figure 4B:
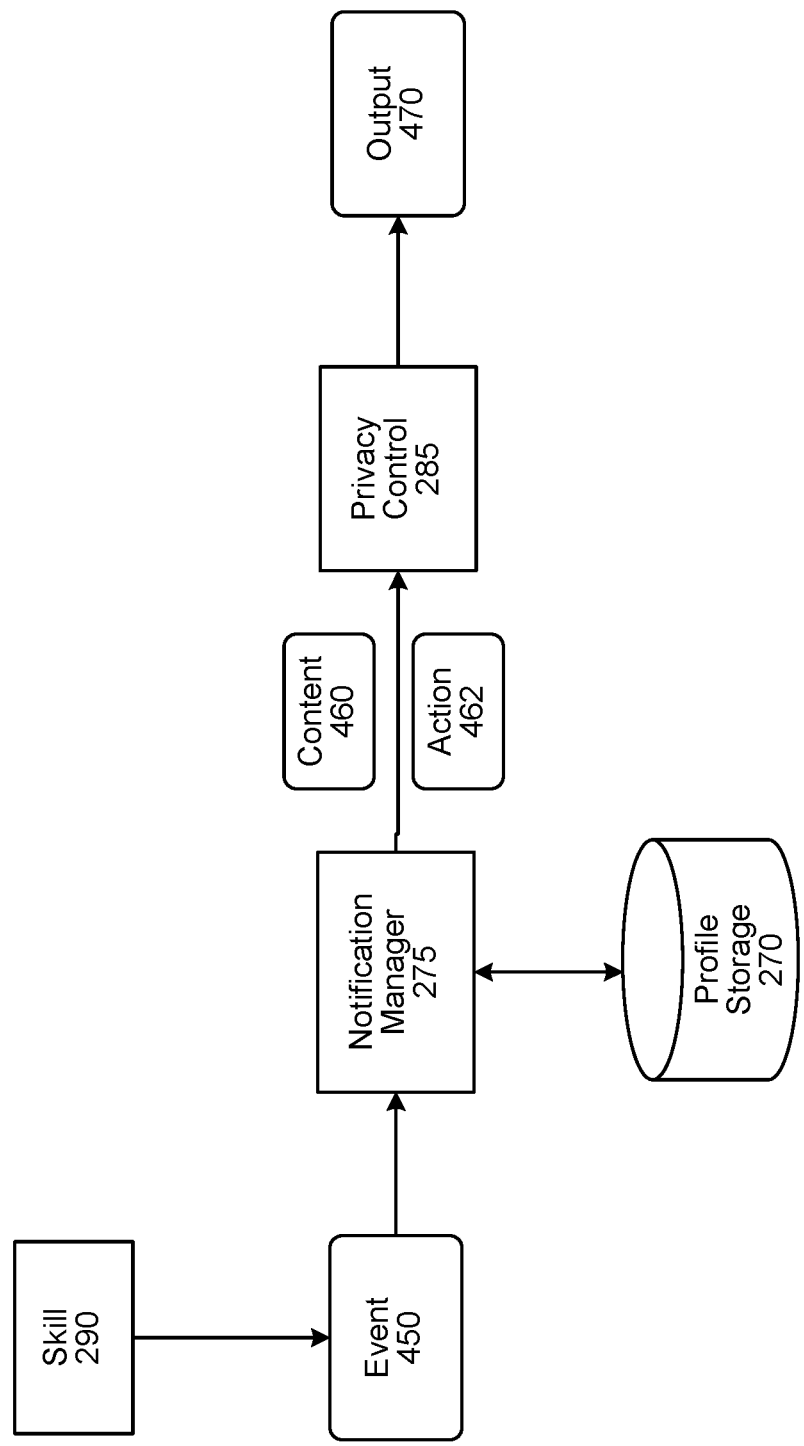
FIG. 4B is a conceptual diagram of a notification manager and a privacy control component to generate output data using sensitive data controls according to embodiments of the present disclosure.

FIG. 4B is a conceptual diagram of the notification manager 275 to generate output data, using sensitive data controls, when an event occurs according to embodiments of the present disclosure. The notification manager 275 determines when an event triggers an output according to the user request (as described in relation to FIG. 1B). A skill component 290 may provide event data 450 indicating occurrence of an event. The notification manager 275 may process the event data 450 and the trigger data 402 from the profile storage 270 to determine if the event data 450 triggers an action associated with the trigger data 402. If the action is triggered, then the notification manager 275 determines content data 460 and action data 462 to be provided to the user in response to the event occurring. The privacy control component 285 processes the content data 460 and the action data 462 to determine one or more privacy controls associated with the output.

In some embodiments, the privacy control component 285 may determine that privacy controls should be applied based on the content of the output, for example, when the privacy control component 285 determines that the output includes sensitive data.

In a non-limiting example, the notification manager 275 may have generated registration data as described above based on the user saying "Alexa, notify me when I get an email from Joe." A skill component 290 may generate event data 450 based on the user profile receiving an email. In this case, the event data 450 may include the name/email address of the sender (e.g., Joe). The notification manager 275 may determine, using the event data 450 and the trigger data 402, that the user is wants to be notified of this event because it is an email from Joe. The notification manager 275 may generate the action data 462 indicating a notification is to be sent to one or more devices associated with the user profile. The notification manager 275 may generate the content data 460 indicating the content of the notification as being "you have received an email from Joe." In this case, the privacy control component 285 may determine that the content data 460 and the action data 462 do not indicate that any privacy controls need to be applied because no sensitive data is being outputted. The privacy control component 285 may also determine that the user did not specify any privacy controls that should be applied in this case.

In another example, the notification manager 275 may have generated registration data as described above based on the user saying "Alexa, tell me when my prescription for Asthma is ready." A skill component 290 may generate event data 450 based on data indicating that a prescription associated with the user profile is ready for pickup at a pharmacy. Using the event data 450 and the trigger data 402, the notification manager 275 may determine that that the user wants to be notified of this event. The notification manager 275 may generate the action data 462 indicating a notification is to be sent to one or more devices associated with the user profile. The notification manager 275 may generate the content data 460 indicating the content of the notification as being "your prescription for Asthma is ready for pickup." The privacy control component 285 may process this content data 460, determine that it includes sensitive data relating to medical information, and determine to apply a privacy control to the output such that the output/notification does not include the sensitive data. For example, the privacy control component 285 may output a notification including "you have a prescription ready" or "you have a medical/pharmacy notification." In this manner, the notification manager 275 determines that the user may not want other persons to know their private medical information, and limits the information provided in the notification.

Continuing with the example, the privacy control component 285, in another case, may process the action data 462 and may determine that an audio notification is to be provided, such that, other persons near the device 110 that is outputting the notification may be able to hear the content of the notification. Based on the device and the type of notification to be provided, the privacy control component 285 may determine to apply privacy controls to the output.

In another case, the privacy control component 285 may process the action data 462 and determine that a visual notification is to be provided to a mobile device 110 associated with the user profile. The privacy control component 285 may determine that the mobile device 110 is designated as a personal device with respect to the user profile. Based on this, the privacy control component 285 may determine to not apply any privacy controls to the output, even though the content data 460 may include sensitive data, because the notification is being provided to a personal user device.

In some embodiments, the privacy control component 285 may determine the privacy control associated with the registration data by retrieving privacy control data from the profile storage 270 associated with the user profile, where the privacy control data indicates the privacy settings defined/specified by the user when providing the user request.

In a non-limiting example, the notification manager 275 may have stored registration data as described above based on the user saying "Alexa, tell me when I receive an email from Joe." The system(s) 120 may respond by asking the user if they want to set any privacy controls: "do you want to enable password/pin protection for this notification?" The user may respond "yes" and may provide a password/pin. The notification manager 275 stores the provided password/pin in profile storage 270 and associates it with the stored registration data. When event data 450 indicating that an email from Joe is received is processed by the notification manager 275 to determine the content data 460 and the action data 462, the privacy control component 285 determines that there is a privacy control (password/pin protection) associated with this notification. The privacy control component 285 generates the output 470 accordingly, by requesting the user for the password/pin. For example, the system(s) 120 may notify the user of a new email without providing details until the password/pin is received, and may output "you have a new email. Please provide your password/pin to receive more details." In this manner, a user-specified privacy control is applied by the notification manager 275 when an output is triggered based on an event occurrence.

The privacy control component 285 may determine output data corresponding to the triggered event (e.g., in response to the user request "tell me when my prescription for Asthma is ready" the notification output may be "your prescription for Asthma is ready."). In applying the privacy controls, the privacy control component 285 modifies the output data to generate the output 470, where the modified output 470 does not include the sensitive data (e.g., output 470 may be the notification "you have a medical notification."). In some embodiments, the modified output 470 may also include a request for authentication data to receive the sensitive data (e.g., output 470 may include "please authenticate using voice to receive additional information regarding your prescription.").

In some embodiments, the privacy control component 285 may employ NLG techniques to determine output data including non-sensitive data or not including the sensitive data. The privacy control component 285 may generate a summary of the sensitive data such that the summary does not include the sensitive data. Using NLG techniques and the summary of the sensitive data, the privacy control component 285 may generate the modified output 470 corresponding to non-sensitive data. The privacy control component 285 may determine data that generally refers to the sensitive data or the category of the sensitive data. Using NLG techniques and the general reference to the sensitive data, the privacy control component 285 may generate the modified output 470 corresponding to non-sensitive data. The privacy control component 285 may determine the modified output 470 by removing or deleting the sensitive data from the original output that includes the sensitive data.

The privacy control component 285, as described herein, is configured to determine whether privacy controls should be applied when a user requests to receive an output in the future when an event occurs, and also determine whether privacy controls should be applied when an output is provided to the user. During generation of the registration data, the privacy control component 285 may process the trigger data 402 and the action data 404 to determine whether privacy controls should be applied and offered to the user based on determining that an output may include sensitive data. During generation of output data in response to an event occurrence, the privacy control component 285 may process the content data 460 and the action data 462 to determine if privacy controls should be applied to the output based on the output including sensitive data.

Although described examples refer applying privacy controls to a user request/intent to receive an output in the future when an event occurs, it should be understood that the functionalities of the system(s) 120 and the privacy control component 285 can be performed with respect to the system(s) 120 generating an output for presentation to the user. In such cases, the orchestrator 230 may provide the output data to the privacy control component 285, and the privacy control component 285 (as described above) may determine that the output data includes sensitive data or causes the device to output/display/announce sensitive data. The privacy control component 285 may determine to apply a privacy control (as described herein) to ensure that sensitive data is not outputted without authenticating the user identity or without user approval.

The privacy control component 285 may determine an output includes sensitive data using various methods. In some embodiments, the privacy control component 285 may be a rule-based engine that determines based on the type of trigger, type of action and/or type of data to be outputted whether privacy controls should be applied. Examples of when privacy control may be applied include when the output data relates to or include medical information, health-related information, adult content, private/personal correspondence information, personal identification information, etc.

In some embodiments, the privacy control component 285 may be a machine-learning model configured to determine whether the trigger data 402, the action data 404, the content data 460, and/or the action data 462 indicates privacy controls should be applied for the particular output. The machine-learning model may be trained using trigger data, action data and/or content data labeled as requiring privacy control, and trigger data, action data and content data labeled as not requiring privacy control. The machine-learning model may process the trigger data 402, the action data 404, the content data 460 and the action data 462 and determine, based on the similarity between them and the training data, whether privacy controls should be applied in the particular case.

In some embodiments, the privacy control component 285 may determine whether privacy controls should be applied for the particular output based on the type/category of the trigger data/event. For example, for outputs/events that relate to health or medical information/category, the privacy control component 285 may always offer privacy controls to the user. In another example, for outputs/events that relate to a taxi/ride booking, the privacy control component 285 may not offer any privacy controls to the user.

In some embodiments, the privacy control component 285 may determine whether privacy controls should be applied for the trigger data 402, the action data 404, the content data 460, and/or the action data 462 based on whether other users have applied privacy controls to similar outputs. For example, if other users frequently request privacy controls for outputs relating to certain smart-home functions, such as, unlocking the front door or another door within the home, then the privacy control component 285 may determine to apply privacy controls (when generating the registration data or when generating the output in response to event occurrence) to an output causing a door associated with the user profile to be unlocked.

In some embodiments, the privacy control component 285 may determine the form of privacy control to apply based on the trigger data 402 or the action data 404. The form of privacy control refers to a type of authentication that a user may provide to receive sensitive data or data indicated by the user that requires authentication.

The type of privacy control may involve modifying the content of the output, sending the output to a particular device (based on user present data, personal device designation, device type, etc.), and may also involve modifying the type of output (e.g., send a visual notification instead of an audible notification).

The type of user authentication may depend upon the type of sensitive data to be included in the output. User authentication may also depend upon the type of data being accessed. Each type of output and/or type of data may have a threshold confidence associated therewith. The threshold confidence may be used by the system to determine one or more data input techniques to use to authenticate the user. The privacy control may additionally be configured according to a contextual situation of a user. If the user is located a threshold distance away from a device, user authentication may involve analyzing speech captured by a microphone or microphone array and/or analyzing one or more image captured by a camera. If the user is, instead, located within a threshold distance of a device, user authentication may involve analyzing an input passcode and/or analyzing input biometric data. Various other combinations of user authentication techniques may be used.

The system(s) 120 may determine threshold user authentication confidence score data that may represent a threshold user authentication confidence score required prior to providing user access to the sensitive data. Each type of sensitive data may have a different threshold user authentication type that must be satisfied. For example, sensitive data corresponding to banking information may have a first user authentication type (e.g., fingerprint recognition), sensitive data corresponding to personal correspondence may have a second user authentication type (e.g., password), etc. The user authentication type may be specific to the data included in the output. For example, if the output includes information (such as name) related to a prescription, then the user authentication type may be voice recognition, whereas if the output did not include the name of the prescription, then the user authentication type may be a password or other user identification data.

The system(s) 120 may determine the user authentication type based on the output device type and the capabilities of the output device type. For example, a speech-controlled device may be capable of capturing audio and/or image data, a wearable device (e.g., a smart watch) that may capture a pulse, a mobile device may be capable of capturing a fingerprint, a facial scan, or a retina scan, a keyboard that may capture a password, etc.

In some embodiments, the user may specify how the sensitive data should be presented. For example, the user may indicate (via a voice input, graphical user interface input, or other types of input) that the sensitive data is announced via a speaker, displayed on a screen, provided via a message (SMS, email, push notification, etc.) or other provided to the user in another manner. The user may also indicate via which device the sensitive data is to be provided, for example, via a smartphone, a speech-controlled device, a smartwatch, or any of the devices 110 shown in FIG. 9.

One or more of the herein described system(s) 120 components may implement one or more trained machine learning models. Various machine learning techniques may be used to train and operate such models. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the trained models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Neural networks may also be used to perform ASR processing including acoustic model processing and language model processing. In the case where an acoustic model uses a neural network, each node of the neural network input layer may represent an acoustic feature of a feature vector of acoustic features, such as those that may be output after the first pass of performing speech recognition, and each node of the output layer represents a score corresponding to a subword unit (such as a phone, triphone, etc.) and/or associated states that may correspond to the sound represented by the feature vector. For a given input to the neural network, it outputs a number of potential outputs each with an assigned score representing a probability that the particular output is the correct output given the particular input. The top scoring output of an acoustic model neural network may then be fed into an HMM which may determine transitions between sounds prior to passing the results to a language model.

In the case where a language model uses a neural network, each node of the neural network input layer may represent a previous word and each node of the output layer may represent a potential next word as determined by the trained neural network language model. As a language model may be configured as a recurrent neural network which incorporates some history of words processed by the neural network, the prediction of the potential next word may be based on previous words in an utterance and not just on the most recent word. The language model neural network may also output weighted predictions for the next word.

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. In another embodiment, the initial connection weights are assigned randomly. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data.

Figure 5:
FIG. 5 is a schematic diagram of an illustrative architecture in which sensor data is combined to recognize one or more users according to embodiments of the present disclosure.

The system(s) 120 may include a user recognition component 295 that recognizes one or more users using a variety of data. As illustrated in FIG. 5, the user recognition component 295 may include one or more subcomponents including a vision component 508, an audio component 510, a biometric component 512, a radio frequency (RF) component 514, a machine learning (ML) component 516, and a recognition confidence component 518. In some instances, the user recognition component 295 may monitor data and determinations from one or more subcomponents to determine an identity of one or more users associated with data input to the system(s) 120. The user recognition component 295 may output user recognition data 595, which may include a user identifier associated with a user the user recognition component 295 believes originated data input to the system(s) 120. The user recognition data 595 may be used to inform processes performed by various components of the system(s) 120.

The vision component 508 may receive data from one or more sensors capable of providing images (e.g., cameras) or sensors indicating motion (e.g., motion sensors). The vision component 508 can perform facial recognition or image analysis to determine an identity of a user and to associate that identity with a user profile associated with the user. In some instances, when a user is facing a camera, the vision component 508 may perform facial recognition and identify the user with a high degree of confidence. In other instances, the vision component 508 may have a low degree of confidence of an identity of a user, and the user recognition component 295 may utilize determinations from additional components to determine an identity of a user. The vision component 508 can be used in conjunction with other components to determine an identity of a user. For example, the user recognition component 295 may use data from the vision component 508 with data from the audio component 510 to identify what user's face appears to be speaking at the same time audio is captured by a device 110 the user is facing for purposes of identifying a user who spoke an input to the system(s) 120.

The overall system of the present disclosure may include biometric sensors that transmit data to the biometric component 512. For example, the biometric component 512 may receive data corresponding to fingerprints, iris or retina scans, thermal scans, weights of users, a size of a user, pressure (e.g., within floor sensors), etc., and may determine a biometric profile corresponding to a user. The biometric component 512 may distinguish between a user and sound from a television, for example. Thus, the biometric component 512 may incorporate biometric information into a confidence level for determining an identity of a user. Biometric information output by the biometric component 512 can be associated with specific user profile data such that the biometric information uniquely identifies a user profile of a user.

The RF component 514 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 514 the strength of the signal (e.g., as a received signal strength indication (RSSI)). The RF component 514 may use the RSSI to determine an identity of a user (with an associated confidence level). In some instances, the RF component 514 may determine that a received RF signal is associated with a mobile device that is associated with a particular user identifier.

In some instances, a device 110 may include some RF or other detection processing capabilities so that a user who speaks an input may scan, tap, or otherwise acknowledge his/her personal device (such as a phone) to the device 110. In this manner, the user may "register" with the system(s) 120 for purposes of the system(s) 120 determining who spoke a particular input. Such a registration may occur prior to, during, or after speaking of an input.

The ML component 516 may track the behavior of various users as a factor in determining a confidence level of the identity of the user. By way of example, a user may adhere to a regular schedule such that the user is at a first location during the day (e.g., at work or at school). In this example, the ML component 516 would factor in past behavior and/or trends in determining the identity of the user that provided input to the system(s) 120. Thus, the ML component 516 may use historical data and/or usage patterns over time to increase or decrease a confidence level of an identity of a user.

In at least some instances, the recognition confidence component 518 receives determinations from the various components 508, 510, 512, 514, and 516, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 595.

The audio component 510 may receive data from one or more sensors capable of providing an audio signal (e.g., one or more microphones) to facilitate recognition of a user. The audio component 510 may perform audio recognition on an audio signal to determine an identity of the user and associated user identifier. In some instances, aspects of the system(s) 120 may be configured at a computing device (e.g., a local server). Thus, in some instances, the audio component 510 operating on a computing device may analyze all sound to facilitate recognition of a user. In some instances, the audio component 510 may perform voice recognition to determine an identity of a user.

The audio component 510 may also perform user identification based on audio data 211 input into the system(s) 120 for speech processing. The audio component 510 may determine scores indicating whether speech in the audio data 211 originated from particular users. For example, a first score may indicate a likelihood that speech in the audio data 211 originated from a first user associated with a first user identifier, a second score may indicate a likelihood that speech in the audio data 211 originated from a second user associated with a second user identifier, etc. The audio component 510 may perform user recognition by comparing speech characteristics represented in the audio data 211 to stored speech characteristics of users (e.g., stored voice profiles associated with the device 110 that captured the spoken user input).

Figure 6:
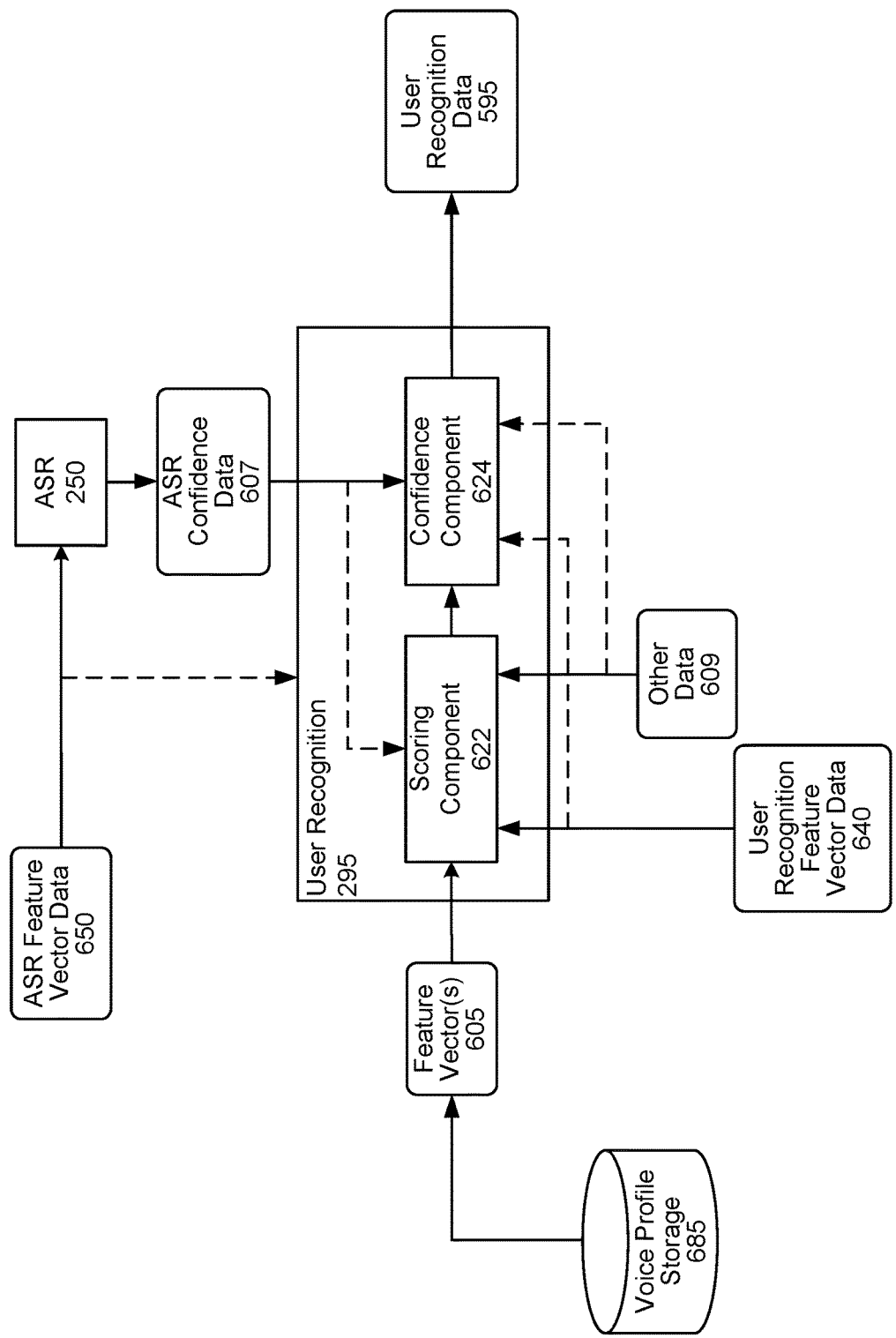
FIG. 6 is a system flow diagram illustrating user recognition according to embodiments of the present disclosure.

FIG. 6 illustrates user recognition processing as may be performed by the user recognition component 295. The ASR component 250 performs ASR processing on ASR feature vector data 650. ASR confidence data 607 may be passed to the user recognition component 295.

The user recognition component 295 performs user recognition using various data including the user recognition feature vector data 640, feature vectors 605 representing voice profiles of users of the system(s) 120, the ASR confidence data 607, and other data 609. The user recognition component 295 may output the user recognition data 595, which reflects a certain confidence that the user input was spoken by one or more particular users. The user recognition data 595 may include one or more user identifiers (e.g., corresponding to one or more voice profiles). Each user identifier in the user recognition data 595 may be associated with a respective confidence value, representing a likelihood that the user input corresponds to the user identifier. A confidence value may be a numeric or binned value.

The feature vector(s) 605 input to the user recognition component 295 may correspond to one or more voice profiles. The user recognition component 295 may use the feature vector(s) 605 to compare against the user recognition feature vector 640, representing the present user input, to determine whether the user recognition feature vector 640 corresponds to one or more of the feature vectors 605 of the voice profiles. Each feature vector 605 may be the same size as the user recognition feature vector 640.

To perform user recognition, the user recognition component 295 may determine the device 110 from which the audio data 211 originated. For example, the audio data 211 may be associated with metadata including a device identifier representing the device 110. Either the device 110 or the system(s) 120 may generate the metadata. The system(s) 120 may determine a group profile identifier associated with the device identifier, may determine user identifiers associated with the group profile identifier, and may include the group profile identifier and/or the user identifiers in the metadata. The system(s) 120 may associate the metadata with the user recognition feature vector 640 produced from the audio data 211. The user recognition component 295 may send a signal to voice profile storage 685, with the signal requesting only audio data and/or feature vectors 605 (depending on whether audio data and/or corresponding feature vectors are stored) associated with the device identifier, the group profile identifier, and/or the user identifiers represented in the metadata. This limits the universe of possible feature vectors 605 the user recognition component 295 considers at runtime and thus decreases the amount of time to perform user recognition processing by decreasing the amount of feature vectors 605 needed to be processed. Alternatively, the user recognition component 295 may access all (or some other subset of) the audio data and/or feature vectors 605 available to the user recognition component 295. However, accessing all audio data and/or feature vectors 605 will likely increase the amount of time needed to perform user recognition processing based on the magnitude of audio data and/or feature vectors 605 to be processed.

If the user recognition component 295 receives audio data from the voice profile storage 685, the user recognition component 295 may generate one or more feature vectors 605 corresponding to the received audio data.

The user recognition component 295 may attempt to identify the user that spoke the speech represented in the audio data 211 by comparing the user recognition feature vector 640 to the feature vector(s) 605. The user recognition component 295 may include a scoring component 622 that determines respective scores indicating whether the user input (represented by the user recognition feature vector 640) was spoken by one or more particular users (represented by the feature vector(s) 605). The user recognition component 295 may also include a confidence component 624 that determines an overall accuracy of user recognition processing (such as those of the scoring component 622) and/or an individual confidence value with respect to each user potentially identified by the scoring component 622. The output from the scoring component 622 may include a different confidence value for each received feature vector 605. For example, the output may include a first confidence value for a first feature vector 605a (representing a first voice profile), a second confidence value for a second feature vector 605b (representing a second voice profile), etc. Although illustrated as two separate components, the scoring component 622 and the confidence component 624 may be combined into a single component or may be separated into more than two components.

The scoring component 622 and the confidence component 624 may implement one or more trained machine learning models (such as neural networks, classifiers, etc.) as known in the art. For example, the scoring component 622 may use probabilistic linear discriminant analysis (PLDA) techniques. PLDA scoring determines how likely it is that the user recognition feature vector 640 corresponds to a particular feature vector 605. The PLDA scoring may generate a confidence value for each feature vector 605 considered and may output a list of confidence values associated with respective user identifiers. The scoring component 622 may also use other techniques, such as GMMs, generative Bayesian models, or the like, to determine confidence values.

The confidence component 624 may input various data including information about the ASR confidence 607, speech length (e.g., number of frames or other measured length of the user input), audio condition/quality data (such as signal-to-interference data or other metric data), fingerprint data, image data, or other factors to consider how confident the user recognition component 295 is with regard to the confidence values linking users to the user input. The confidence component 624 may also consider the confidence values and associated identifiers output by the scoring component 622. For example, the confidence component 624 may determine that a lower ASR confidence 607, or poor audio quality, or other factors, may result in a lower confidence of the user recognition component 295. Whereas a higher ASR confidence 607, or better audio quality, or other factors, may result in a higher confidence of the user recognition component 295. Precise determination of the confidence may depend on configuration and training of the confidence component 624 and the model(s) implemented thereby. The confidence component 624 may operate using a number of different machine learning models/techniques such as GMM, neural networks, etc. For example, the confidence component 624 may be a classifier configured to map a score output by the scoring component 622 to a confidence value.

The user recognition component 295 may output user recognition data 595 specific to a one or more user identifiers. For example, the user recognition component 295 may output user recognition data 595 with respect to each received feature vector 605. The user recognition data 595 may include numeric confidence values (e.g., 0.0-1.0, 0-1000, or whatever scale the system is configured to operate). Thus, the user recognition data 595 may output an n-best list of potential users with numeric confidence values (e.g., user identifier 123—0.2, user identifier 234 —0.8). Alternatively or in addition, the user recognition data 595 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." The user recognition component 295 may output an n-best list of user identifiers with binned confidence values (e.g., user identifier 123— low, user identifier 234—high). Combined binned and numeric confidence value outputs are also possible. Rather than a list of identifiers and their respective confidence values, the user recognition data 595 may only include information related to the top scoring identifier as determined by the user recognition component 295. The user recognition component 295 may also output an overall confidence value that the individual confidence values are correct, where the overall confidence value indicates how confident the user recognition component 295 is in the output results. The confidence component 624 may determine the overall confidence value.

The confidence component 624 may determine differences between individual confidence values when determining the user recognition data 595. For example, if a difference between a first confidence value and a second confidence value is large, and the first confidence value is above a threshold confidence value, then the user recognition component 295 is able to recognize a first user (associated with the feature vector 605 associated with the first confidence value) as the user that spoke the user input with a higher confidence than if the difference between the confidence values were smaller.

The user recognition component 295 may perform thresholding to avoid incorrect user recognition data 595 being output. For example, the user recognition component 295 may compare a confidence value output by the confidence component 624 to a threshold confidence value. If the confidence value does not satisfy (e.g., does not meet or exceed) the threshold confidence value, the user recognition component 295 may not output user recognition data 595, or may only include in that data 595 an indicator that a user that spoke the user input could not be recognized. Further, the user recognition component 295 may not output user recognition data 595 until enough user recognition feature vector data 640 is accumulated and processed to verify a user above a threshold confidence value. Thus, the user recognition component 295 may wait until a sufficient threshold quantity of audio data of the user input has been processed before outputting user recognition data 595. The quantity of received audio data may also be considered by the confidence component 624.

The user recognition component 295 may be defaulted to output binned (e.g., low, medium, high) user recognition confidence values. However, such may be problematic in certain situations. For example, if the user recognition component 295 computes a single binned confidence value for multiple feature vectors 605, the system may not be able to determine which particular user originated the user input. In this situation, the user recognition component 295 may override its default setting and output numeric confidence values. This enables the system to determine a user, associated with the highest numeric confidence value, originated the user input.

The user recognition component 295 may use other data 609 to inform user recognition processing. A trained model(s) or other component of the user recognition component 295 may be trained to take other data 609 as an input feature when performing user recognition processing. Other data 609 may include a variety of data types depending on system configuration and may be made available from other sensors, devices, or storage. The other data 609 may include a time of day at which the audio data 211 was generated by the device 110 or received from the device 110, a day of a week in which the audio data audio data 211 was generated by the device 110 or received from the device 110, etc.

The other data 609 may include image data or video data. For example, facial recognition may be performed on image data or video data received from the device 110 from which the audio data 211 was received (or another device). Facial recognition may be performed by the user recognition component 295. The output of facial recognition processing may be used by the user recognition component 295. That is, facial recognition output data may be used in conjunction with the comparison of the user recognition feature vector 640 and one or more feature vectors 605 to perform more accurate user recognition processing.

The other data 609 may include location data of the device 110. The location data may be specific to a building within which the device 110 is located. For example, if the device 110 is located in user A's bedroom, such location may increase a user recognition confidence value associated with user A and/or decrease a user recognition confidence value associated with user B.

The other data 609 may include data indicating a type of the device 110. Different types of devices may include, for example, a smart watch, a smart phone, a tablet, and a vehicle. The type of the device 110 may be indicated in a profile associated with the device 110. For example, if the device 110 from which the audio data 211 was received is a smart watch or vehicle belonging to a user A, the fact that the device 110 belongs to user A may increase a user recognition confidence value associated with user A and/or decrease a user recognition confidence value associated with user B.

The other data 609 may include geographic coordinate data associated with the device 110. For example, a group profile associated with a vehicle may indicate multiple users (e.g., user A and user B). The vehicle may include a global positioning system (GPS) indicating latitude and longitude coordinates of the vehicle when the vehicle generated the audio data 211. As such, if the vehicle is located at a coordinate corresponding to a work location/building of user A, such may increase a user recognition confidence value associated with user A and/or decrease user recognition confidence values of all other users indicated in a group profile associated with the vehicle. A profile associated with the device 110 may indicate global coordinates and associated locations (e.g., work, home, etc.). One or more user profiles may also or alternatively indicate the global coordinates.

The other data 609 may include data representing activity of a particular user that may be useful in performing user recognition processing. For example, a user may have recently entered a code to disable a home security alarm. A device 110, represented in a group profile associated with the home, may have generated the audio data 211. The other data 609 may reflect signals from the home security alarm about the disabling user, time of disabling, etc. If a mobile device (such as a smart phone, Tile, dongle, or other device) known to be associated with a particular user is detected proximate to (for example physically close to, connected to the same WiFi network as, or otherwise nearby) the device 110, this may be reflected in the other data 609 and considered by the user recognition component 295.

Depending on system configuration, the other data 609 may be configured to be included in the user recognition feature vector data 640 so that all the data relating to the user input to be processed by the scoring component 622 may be included in a single feature vector. Alternatively, the other data 609 may be reflected in one or more different data structures to be processed by the scoring component 622.

Figure 7:
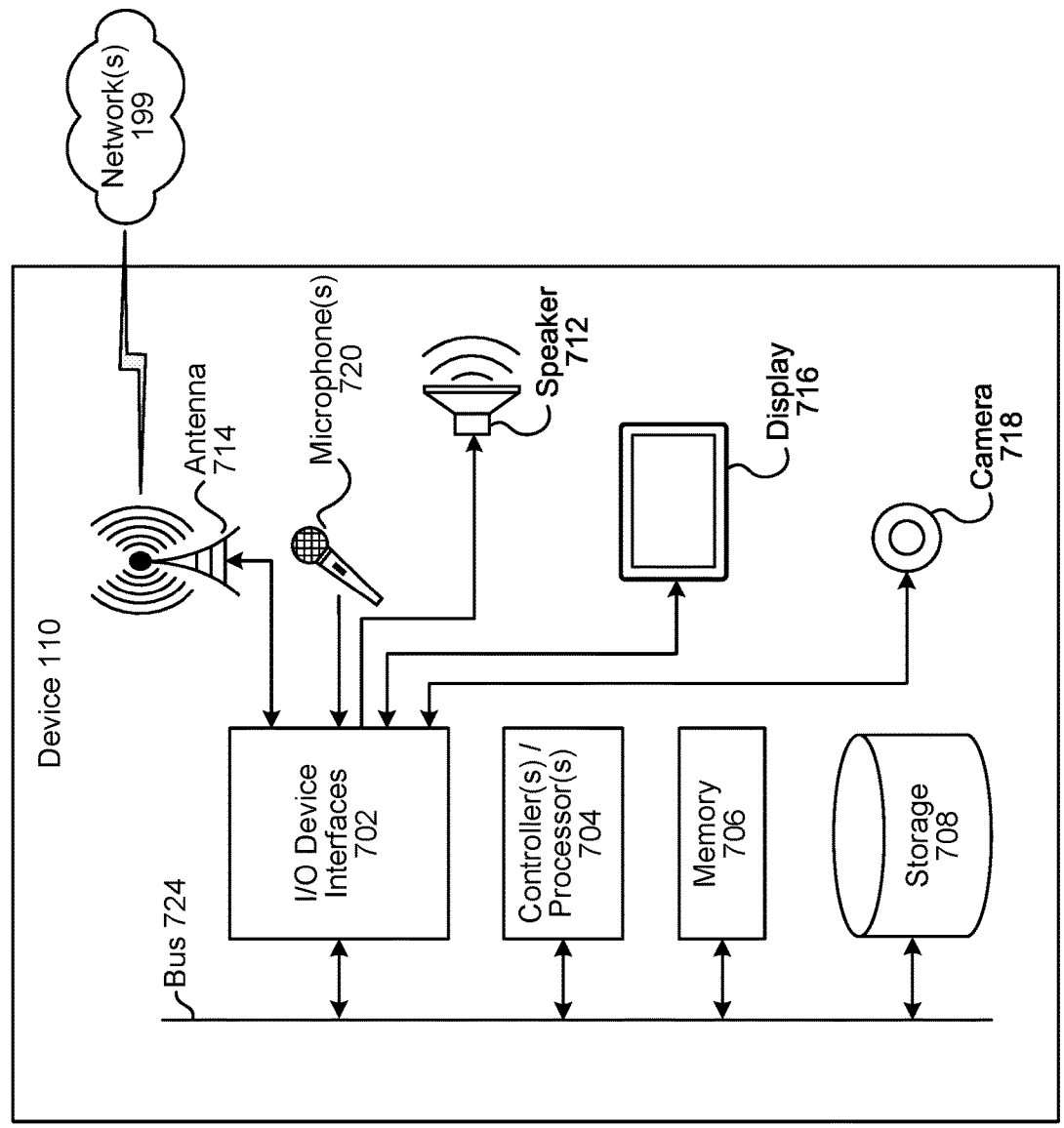
FIG. 7 is a block diagram conceptually illustrating example components of a device according to embodiments of the present disclosure.
Figure 8:
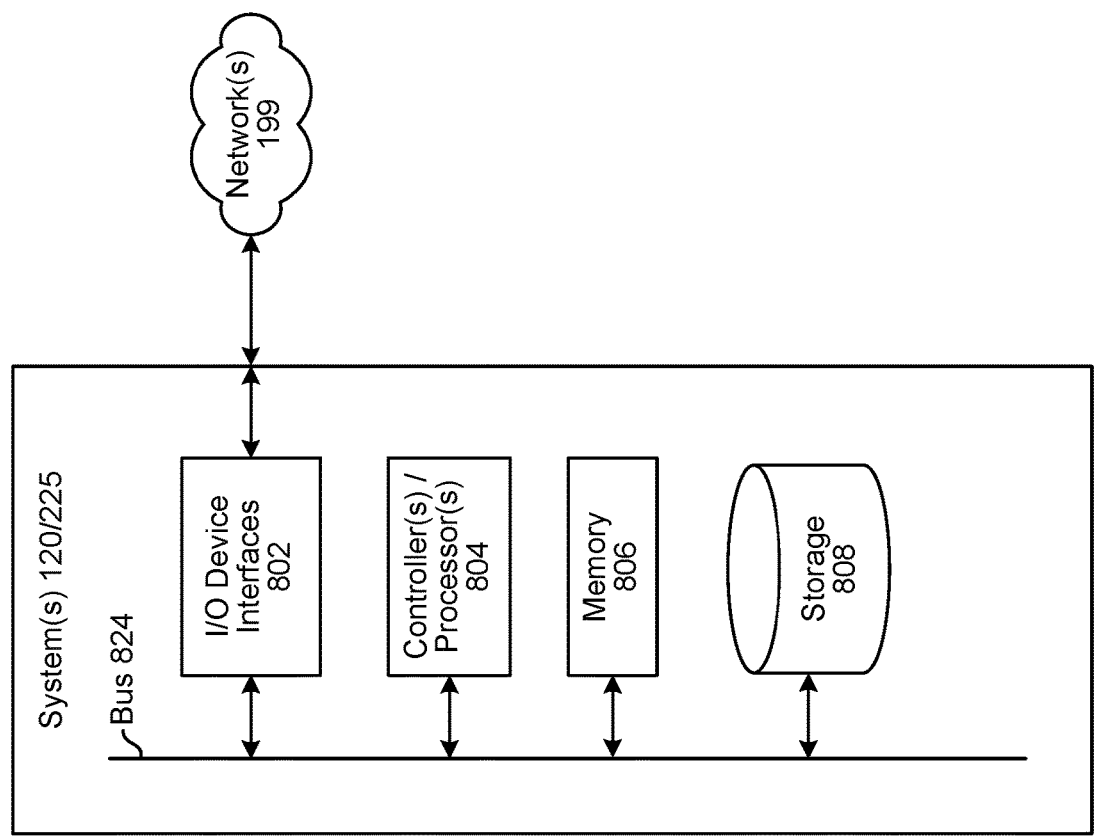
FIG. 8 is a block diagram conceptually illustrating example components of a system according to embodiments of the present disclosure.

FIG. 7 is a block diagram conceptually illustrating a device 110 that may be used with the system. FIG. 8 is a block diagram conceptually illustrating example components of a remote device, such as the system(s) 120, which may assist with ASR processing, NLU processing, etc., and the skill system(s) 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the overall system of the present disclosure, such as one or more systems 120 for performing ASR processing, one or more systems 120 for performing NLU processing, one or more skill systems 225 for performing actions responsive to user inputs, etc. In operation, each of these systems may include computer-readable and computer-executable instructions that reside on the respective device (120/225), as will be discussed further below.

Each of these devices (110/120/225) may include one or more controllers/processors (704/804), which may each include a central processing unit (CPU) for processing data and computer-readable instructions, and a memory (706/806) for storing data and instructions of the respective device. The memories (706/806) may individually include volatile random access memory (RAM), non-volatile read only memory (ROM), non-volatile magnetoresistive memory (MRAM), and/or other types of memory. Each device (110/120/225) may also include a data storage component (708/808) for storing data and controller/processor-executable instructions. Each data storage component (708/808) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (702/802).

Computer instructions for operating each device (110/120/225) and its various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device in addition to or instead of software.

Each device (110/120/225) includes input/output device interfaces (702/802). A variety of components may be connected through the input/output device interfaces (702/802), as will be discussed further below. Additionally, each device (110/120/225) may include an address/data bus (724/824) for conveying data among components of the respective device. Each component within a device (110/120/225) may also be directly connected to other components in addition to (or instead of) being connected to other components across the bus (724/824).

Referring to FIG. 7, the device 110 may include input/output device interfaces 702 that connect to a variety of components such as an audio output component such as a speaker 712, a wired headset or a wireless headset (not illustrated), or other component capable of outputting audio. The device 110 may also include an audio capture component. The audio capture component may be, for example, a microphone 720 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 716 for displaying content. The device 110 may further include a camera 718.

Via antenna(s) 714, the input/output device interfaces 702 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (702/802) may also include communication components that allow data to be exchanged between devices such as different physical servers in a collection of servers or other components.

The components of the device(s) 110, the system(s) 120, or the skill system(s) 225 may include their own dedicated processors, memory, and/or storage. Alternatively, one or more of the components of the device(s) 110, the system(s) 120, or the skill system(s) 225 may utilize the I/O interfaces (702/802), processor(s) (704/804), memory (706/806), and/or storage (708/808) of the device(s) 110 system(s) 120, or the skill system(s) 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 225, as described herein, are illustrative, and may be located as a stand-alone device or may be included, in whole or in part, as a component of a larger device or system.

Figure 9:
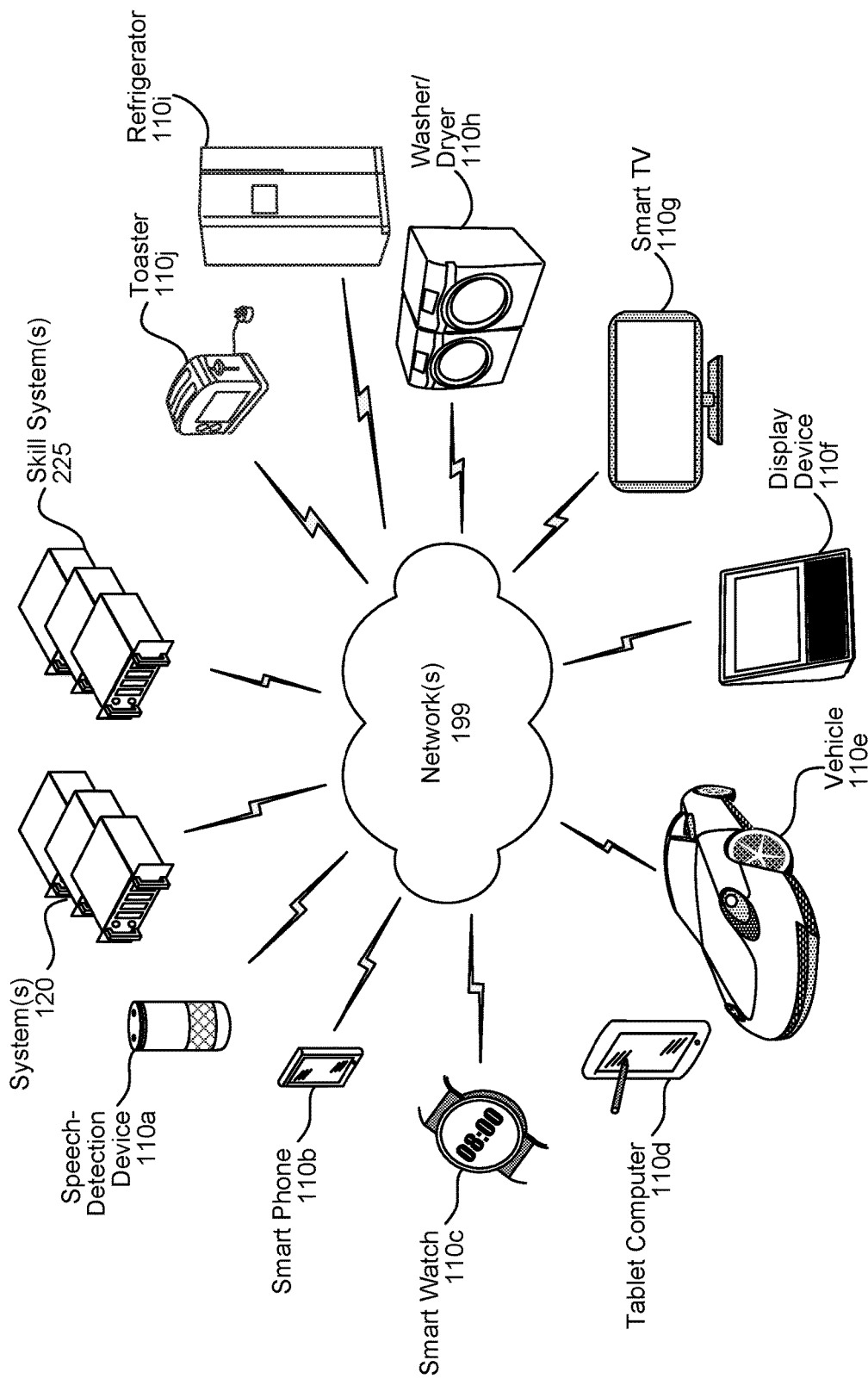
FIG. 9 illustrates an example of a computer network for use with the speech processing system.

As illustrated in FIG. 9, multiple devices (110a-110j, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a toaster 110j may be connected to the network(s) 199 through a wireless service provider, over a WiFi or cellular network connection, or the like. Other devices are included as network-connected support devices, such as the system(s) 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   during a first time period:
      receiving first input audio data corresponding to a first utterance, the first input audio data associated with a user profile;
      determining, from the first input audio data, that the first utterance requests a first notification be output when a first event occurs;
      generating first trigger data representing the first notification is to be output when the first event occurs; and
      associating the first trigger data with the user profile;
   during a second time period subsequent to the first time period:
      receiving first event data;
      determining that the first event data corresponds to the first event represented by the first trigger data;
      determining, using the first trigger data, that the first notification is to be output with respect to the user profile;
      determining first output text data representing the first notification;
      determining, using semantic analysis, that the first output text data includes a representation of first sensitive data;
      based at least in part on the first output text data including the representation of the first sensitive data, determining a first privacy control associated with the user profile and indicating stored user recognition data to be used to access the representation of the first sensitive data;
      generating second output text data requesting an input usable to authenticate a user identity using the stored user recognition data;
      determining, using text-to-speech (TTS) processing, first output audio data from the second output text data;
      causing the first output audio data to be presented;
      after causing the first output audio data to be presented, receiving authentication data;
      determining, using the stored user recognition data, that the authentication data satisfies the first privacy control;
      based at least in part on determining that the authentication data satisfies the first privacy control, processing, using TTS processing, the first output text data to determine second output audio data, the second output audio data including the representation of the first sensitive data; and
      causing the second output audio data to be presented.

2. The computer-implemented method of claim 1, further comprising:
   receiving second input audio data corresponding to a second utterance, the second input audio data associated with the user profile;
   determining, from the second input audio data, that the second utterance requests a second notification be output when a second event occurs;
   generating second trigger data representing the second notification is to be output when the second event occurs;
   determining the second notification includes a representation of second sensitive data;
   based at least in part on determining the second notification includes the representation of the second sensitive data, determining third output text data requesting a second privacy control with respect to receiving the second notification;

processing, using TTS processing, the third output text data to determine third output audio data;

causing the third output audio data to be presented;

receiving third input audio data in response to the third output audio data, the third input audio data corresponding to a third utterance indicating the stored user recognition data is to be used to authenticate a user identity prior to outputting the second notification;

generating a second privacy control indicating the stored user recognition data is to be used to authenticate a user identity prior to outputting the second notification; and associating the second trigger data and the second privacy control with the user profile.

3. The computer-implemented method of claim 1, further comprising receiving second event data;

determining that the second event data triggers output of a second notification with respect to the user profile;

determining a second privacy control associated with the second notification;

determining third output text data corresponding to the second notification, the third output text data comprising:
a first portion, and
a second portion corresponding to the second privacy control;

processing, using TTS processing, the first portion of the third output text data to determine third output audio data; and causing the third output audio data to be presented.

4. The computer-implemented method of claim 1, further comprising during the second time period:

determining an event type corresponding to the first event data; and determining the first privacy control is associated with the event type, the first privacy control corresponding to voice recognition, wherein the second output text data requests a voice input to authenticate the user identity.

5. A computer-implemented method comprising:

receiving first input data corresponding to a first user input, the first input data associated with a user profile;

determining, from the first input data, that the first user input requests a first notification be output when a first event occurs;

generating first trigger data representing the first notification is to be output when the first event occurs;

after generating the first trigger data, receiving event data;

determining the event data corresponds to the first event represented by the first trigger data;

determining, using the first trigger data, that the first notification is to be output with respect to the user profile;

determining first output data corresponding to the first notification;

processing, using semantic analysis, the first output data to determine that the first output data includes a representation of sensitive data;

based at least in part on determining that the first output data includes the representation of the sensitive data, determining second output data corresponding to the first notification, wherein the second output data excludes the representation of the sensitive data, and wherein the second output data requests an input for user authentication processing;

causing the second output data to be presented;

after causing the second output data to be presented, receiving authentication data;

determining that the authentication data satisfies a first privacy control to access the representation of the sensitive data; and based at least in part on the authentication data satisfying the first privacy control, causing the first output data to be presented.

6. The computer-implemented method of claim 5, further comprising:

determining stored user recognition data associated with the user profile; and determining, using the stored user recognition data, that the authentication data satisfies the first privacy control.

7. The computer-implemented method of claim 5, further comprising:

determining a device associated with the user profile;

determining, using the user profile, that the device is designated as a personal device; and based at least in part on the device being designated as the personal device, causing the first output data to be presented using the device without previously presenting the second output data.

8. The computer-implemented method of claim 5, further comprising:

determining a portion of the first output data that corresponds to the representation of the sensitive data; and using natural language generation, determining the second output data to include at least a portion representing the sensitive data in a non-sensitive manner.

9. The computer-implemented method of claim 5, further comprising:

determining the first output data to include a description of the first event;

determining text data representing the first output data; and determining, using natural language understanding, that the text data includes at least one word that corresponds to the sensitive data.

10. The computer-implemented method of claim 5, further comprising:

determining an event type corresponding to the event data;

determining the first privacy control is associated with the event type;

determining, using the first privacy control, to send a visual notification indicating occurrence of the first event;

determining third output data corresponding to the visual notification and including the representation of the sensitive data; and causing the third output data to be presented.

11. The computer-implemented method of claim 5, wherein the first input data is input audio data, wherein the first user input is an utterance, and wherein the computer-implemented method further comprises:

processing the input audio data using automatic speech recognition (ASR) to determine text data;

processing the text data using natural language understanding (NLU) to determine the utterance corresponds to an intent to receive the first notification when the first event occurs; and prior to receiving the event data, associating the first trigger data with the user profile.

12. The computer-implemented method of claim 5, further comprising:
  receiving second input data corresponding to a second user input, the second input data associated with the user profile;
  determining, from the second input data, that the second user input requests a second notification be output when a second event occurs;
  generating second trigger data representing the second notification is to be output when the second event occurs;
  determining the second notification includes a representation of second sensitive data;
  based at least in part on determining the second notification includes the representation of the second sensitive data, determining third output data requesting a second privacy control with respect to receiving the second notification;
  causing the third output data to be presented;
  receiving third input data in response to the third output data, the third input data corresponding to a third user input indicating stored user recognition data is to be used to authenticate a user identity prior to outputting the second notification;
  generating a second privacy control indicating the stored user recognition data is to be used to authenticate a user identity prior to outputting the second notification; and
  associating the second trigger data and the second privacy control with the user profile.

13. A system comprising:
  at least one processor; and
  at least one memory including instructions that, when executed by the at least one processor, cause the system to:
    receive first input data corresponding to a first user input, the first input data associated with a user profile;
    determine, from the first input data, that the first user input requests a first notification be output when a first event occurs;
    generate first trigger data representing the first notification is to be output when the first event occurs;
    after the generation of the first trigger data, receive event data;
    determining the event data corresponds to the first event represented by the first trigger data;
    determine, using the first trigger data, that the first notification is to be output with respect to the user profile;
    determining first output data corresponding to the first notification;
    process, using semantic analysis, the first output data to determine that the first output data includes a representation of sensitive data;
    based at least in part on determining that the first output data includes the representation of the sensitive data, determine second output data corresponding to the first notification, wherein the second output data excludes the representation of the sensitive data, and wherein the second output data requests an input for user authentication processing;
    cause the second output data to be presented;
    after causing the second output data to be presented, receive authentication data;
    determine that the authentication data satisfies a first privacy control to access the representation of the sensitive data; and
    based at least in part on the authentication data satisfying the first privacy control, cause the first output data to be presented.

14. The system of claim 13, wherein the instructions that, when executed by the at least one processor, further cause the system to:
  determine stored user recognition data associated with the user profile; and
  determine, using the stored user recognition data, that the authentication data satisfies the first privacy control.

15. The system of claim 13, wherein the instructions that, when executed by the at least one processor, further cause the system to:
  determine a device associated with the user profile;
  determine, using the user profile, that the device is designated as a personal device; and
  based at least in part on the device being designated as the personal device, cause the first output data to be presented using the device without previously presenting the second output data.

16. The system of claim 13, wherein the instructions that, when executed by the at least one processor, further causes the system to:
  determine a portion of the first output data that corresponds to the representation of the sensitive data; and
  using natural language generation, determine the second output data to include at least a portion representing the sensitive data in a non-sensitive manner.

17. The system of claim 13, wherein the instructions that, when executed by the at least one processor, further cause the system to:
  determine the first output data to include a description of the first event;
  determine text data representing the first output data; and
  determine, using natural language understanding, that the text data includes at least one word that corresponds to the sensitive data.

18. The system of claim 13, wherein the instructions that, when executed by the at least one processor, further cause the system to:
  determine an event type corresponding to the event data;
  determine the first privacy control is associated with the event type;
  determine, using the first privacy control, to send a visual notification indicating occurrence of the first event;
  determine third output data corresponding to the visual notification and including the representation of the sensitive data; and
  cause the third output data to be presented.

19. The system of claim 13, wherein the first input data is input audio data, wherein the first user input is an utterance, and wherein the instructions that, when executed by the at least one processor, further cause the system to:
  process the input audio data using automatic speech recognition (ASR) to determine text data;
  process the text data using natural language understanding (NLU) to determine the utterance corresponds to an intent to receive the first notification when the first event occurs; and
  prior to receiving the event data, associate the first trigger data with the user profile.

20. The system of claim 13, wherein the instructions that, when executed by the at least one processor, further cause the system to:
  receive second input data corresponding to a second user input, the second input data associated with the user profile;

determining, from the second input data, that the second user input requests a second notification be output when a second event occurs;

generating second trigger data representing the second notification is to be output when the second event occurs;

determine the second notification includes a representation of second sensitive data;

based at least in part on determining the second notification includes the representation of the second sensitive data, determine third output data requesting a second privacy control with respect to receiving the second notification;

cause the third output data to be presented;

receive third input data in response to the third output data, the third input data correspond to a third user input indicating stored user recognition data is to be used to authenticate a user identity prior to outputting the second notification;

generate a second privacy control indicating the stored user recognition data is to be used to authenticate a user identity prior to outputting the second notification; and associate the second trigger data and the second privacy control with the user profile.

* * * * *